United States Patent
Choi et al.

(10) Patent No.: US 9,961,484 B2
(45) Date of Patent: May 1, 2018

(54) METHOD AND APPARATUS FOR CONTROLLING A DEVICE USING BLUETOOTH TECHNOLOGY

(71) Applicant: LG ELECTRONICS INC., Seoul (KR)

(72) Inventors: Jingu Choi, Seoul (KR); Byungjoo Lee, Seoul (KR); Younghwan Kwon, Seoul (KR); Minsoo Lee, Seoul (KR); Hyeonjae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/412,829

(22) Filed: Jan. 23, 2017

(65) Prior Publication Data

US 2017/0215030 A1    Jul. 27, 2017

Related U.S. Application Data

(60) Provisional application No. 62/281,740, filed on Jan. 22, 2016.

(51) Int. Cl.

| | | |
|---|---|---|
| *H04B 7/00* | (2006.01) | |
| *H04M 1/00* | (2006.01) | |
| *H04W 4/00* | (2018.01) | |
| *H04W 76/02* | (2009.01) | |
| *H04W 8/00* | (2009.01) | |

(Continued)

(52) U.S. Cl.
CPC ........... *H04W 4/008* (2013.01); *H04W 8/005* (2013.01); *H04W 12/04* (2013.01); *H04W 12/06* (2013.01); *H04W 76/021* (2013.01); *H04W 76/023* (2013.01); *H04W 84/12* (2013.01)

(58) Field of Classification Search
CPC ..... H04W 4/008; H04W 12/06; H04W 12/08; H04W 76/023; H04W 84/12; H04B 1/3827; H04B 7/26; H04M 1/7253
USPC ...... 455/41.1, 41.2, 41.3, 436, 552.1, 553.1; 370/328, 331
See application file for complete search history.

(56) References Cited

U.S. PATENT DOCUMENTS

| | | | | |
|---|---|---|---|---|
| 8,897,344 B2* | 11/2014 | Maguire | ............... | H04W 60/00 375/219 |
| 9,107,026 B1* | 8/2015 | Viswanadham | ...... | H04W 8/005 |

(Continued)

*Primary Examiner* — Quochien B Vuong
(74) *Attorney, Agent, or Firm* — Birch, Stewart, Kolasch & Birch, LLP

(57) ABSTRACT

Disclosed are a method and apparatus for forming, by a first device, forming a Wi-Fi connection with a second device using Bluetooth LE in a wireless communication system, including receiving an advertising message from the second device, forming a Bluetooth LE connection with the second device based on the advertising message, transmitting a first write request message to the second device requesting writing of authentication information necessary for performing Wi-Fi authentication with the third device, wherein the first write request message including the authentication information, receiving a write response message from the second device as a response to the first write request message, and sending a second write request message to request the writing of Opcode indicating a Wi-Fi connection with the third device to the second device. The second write request message includes identification information for identifying the third device, and the Wi-Fi connection is formed between the second and the third devices based on the authentication information.

11 Claims, 34 Drawing Sheets

(51) Int. Cl.
*H04W 12/06* (2009.01)
*H04W 12/04* (2009.01)
*H04W 84/12* (2009.01)

(56) References Cited

U.S. PATENT DOCUMENTS

| | | | |
|---|---|---|---|
| 9,155,026 B2 * | 10/2015 | Wang | H04W 48/10 |
| 9,319,828 B2 * | 4/2016 | Decuir | H04W 4/008 |
| 9,326,093 B2 * | 4/2016 | Xie | H04W 4/008 |
| 9,686,643 B2 * | 6/2017 | Viswanadham | H04W 4/02 |
| 2016/0050551 A1 * | 2/2016 | Qi | H04W 8/005 |
| | | | 455/434 |

* cited by examiner

[Fig.1]
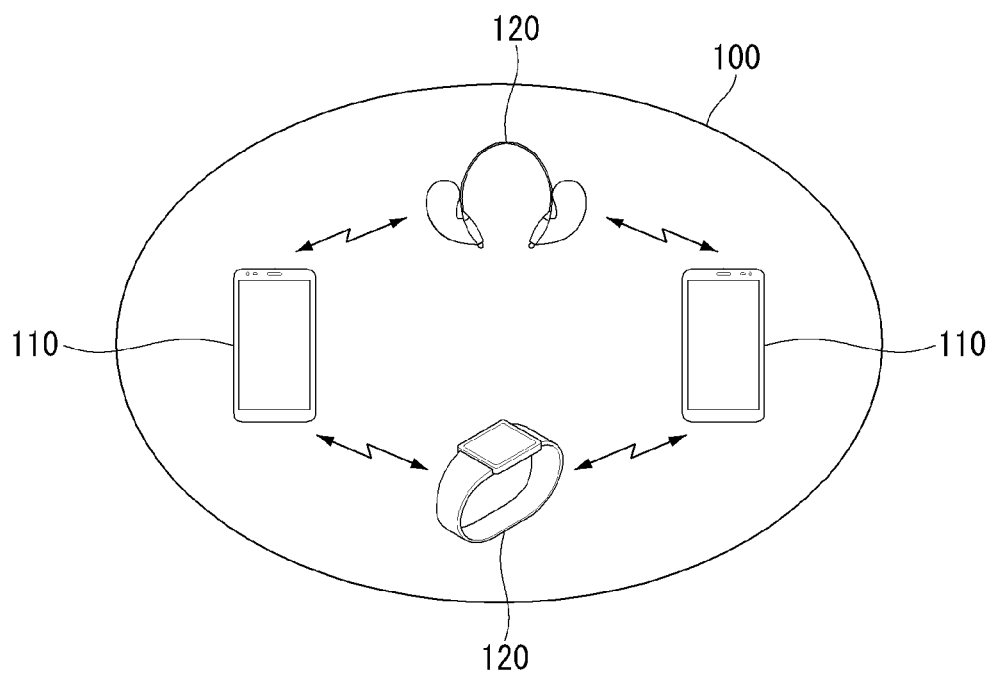

[Fig.2]
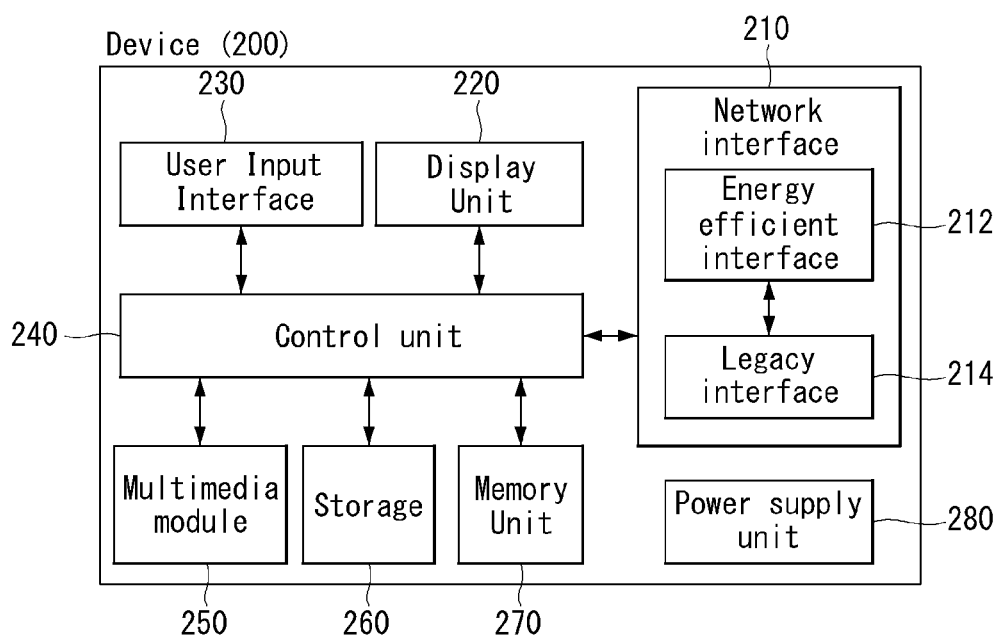

[Fig.3]
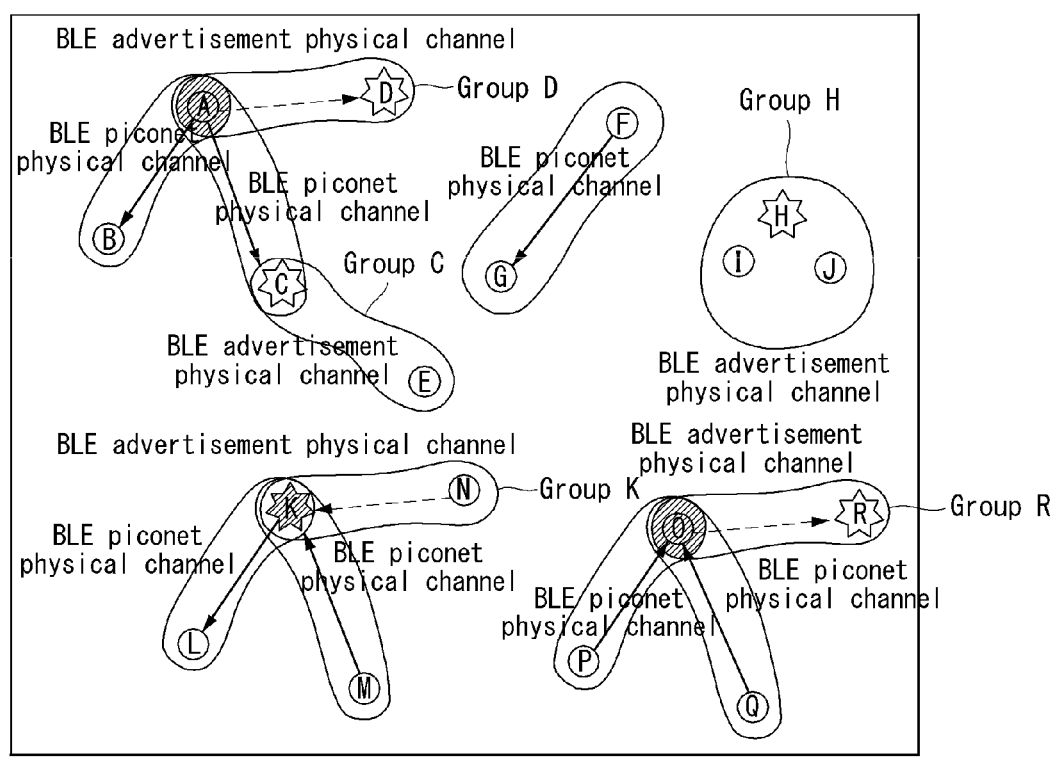

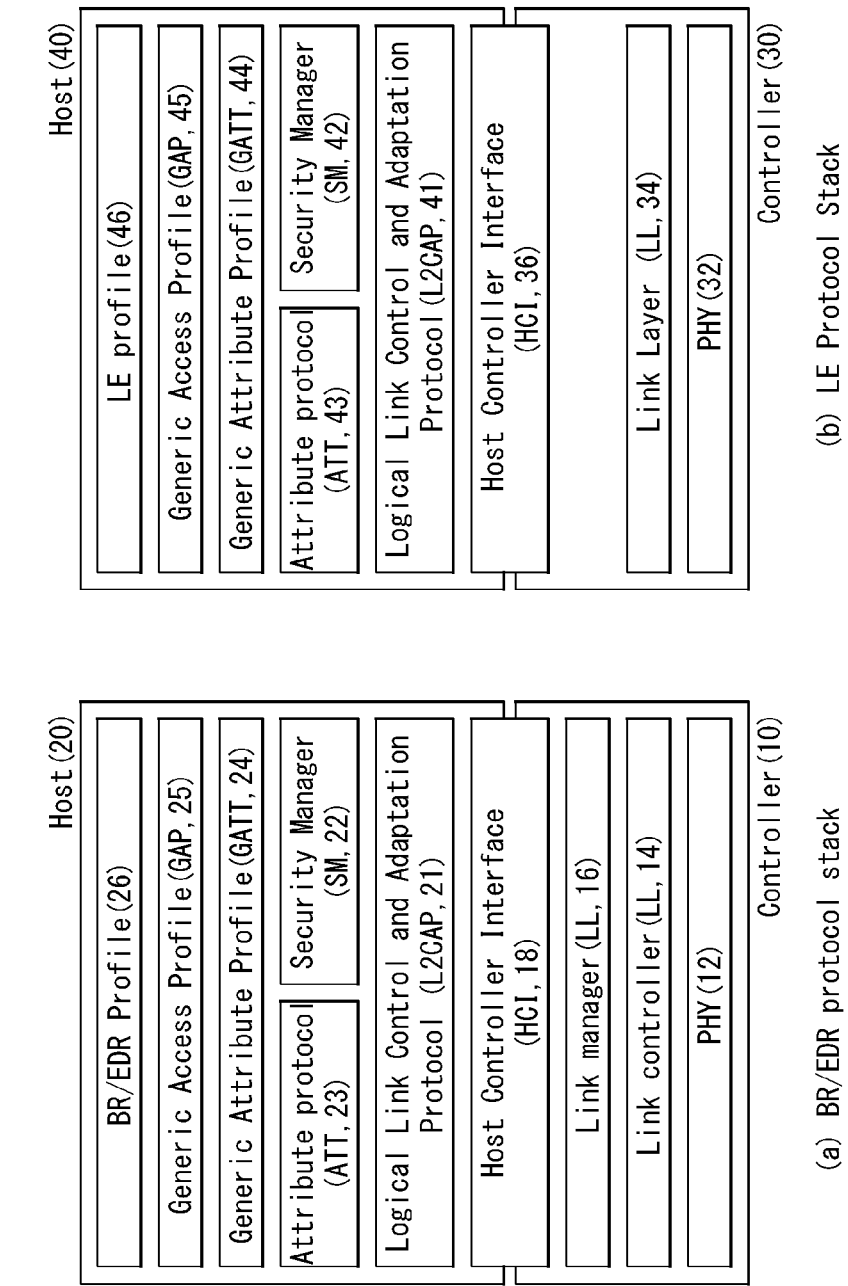
[Fig.4]

[Fig.5]
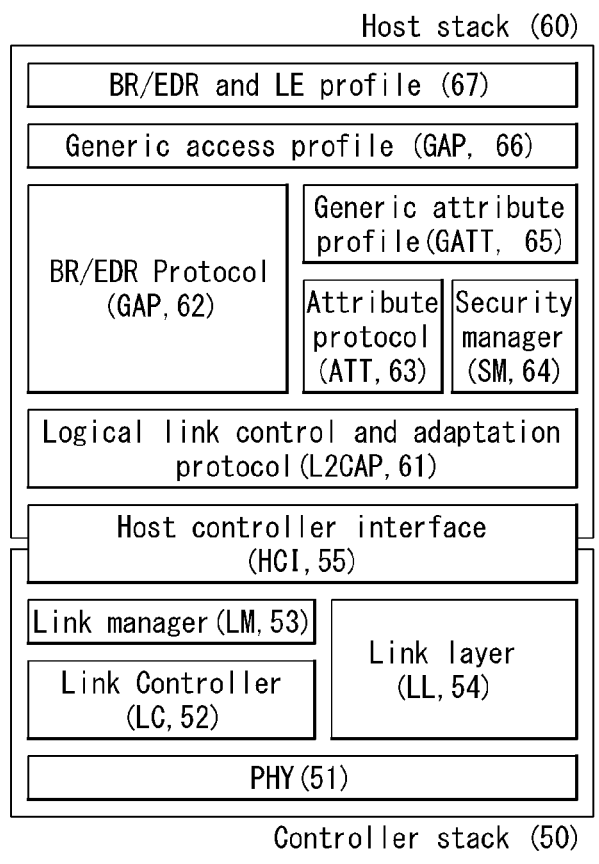
(Dual Mode Architecture)

[Fig.6]
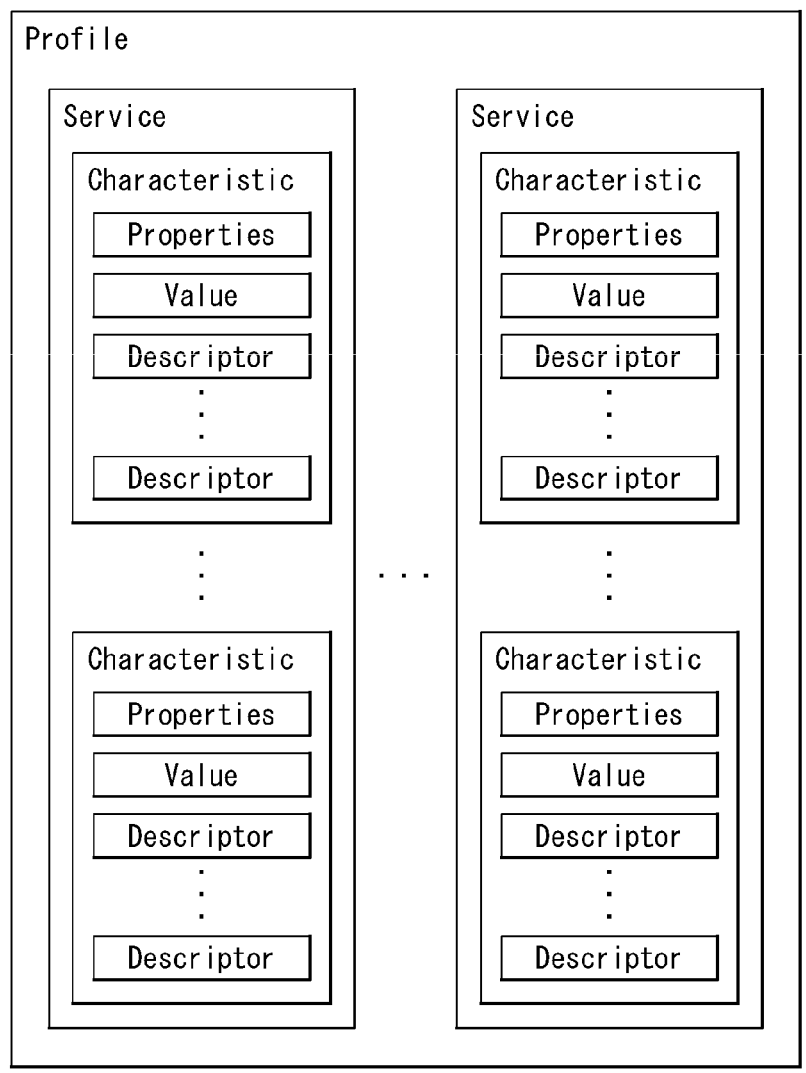

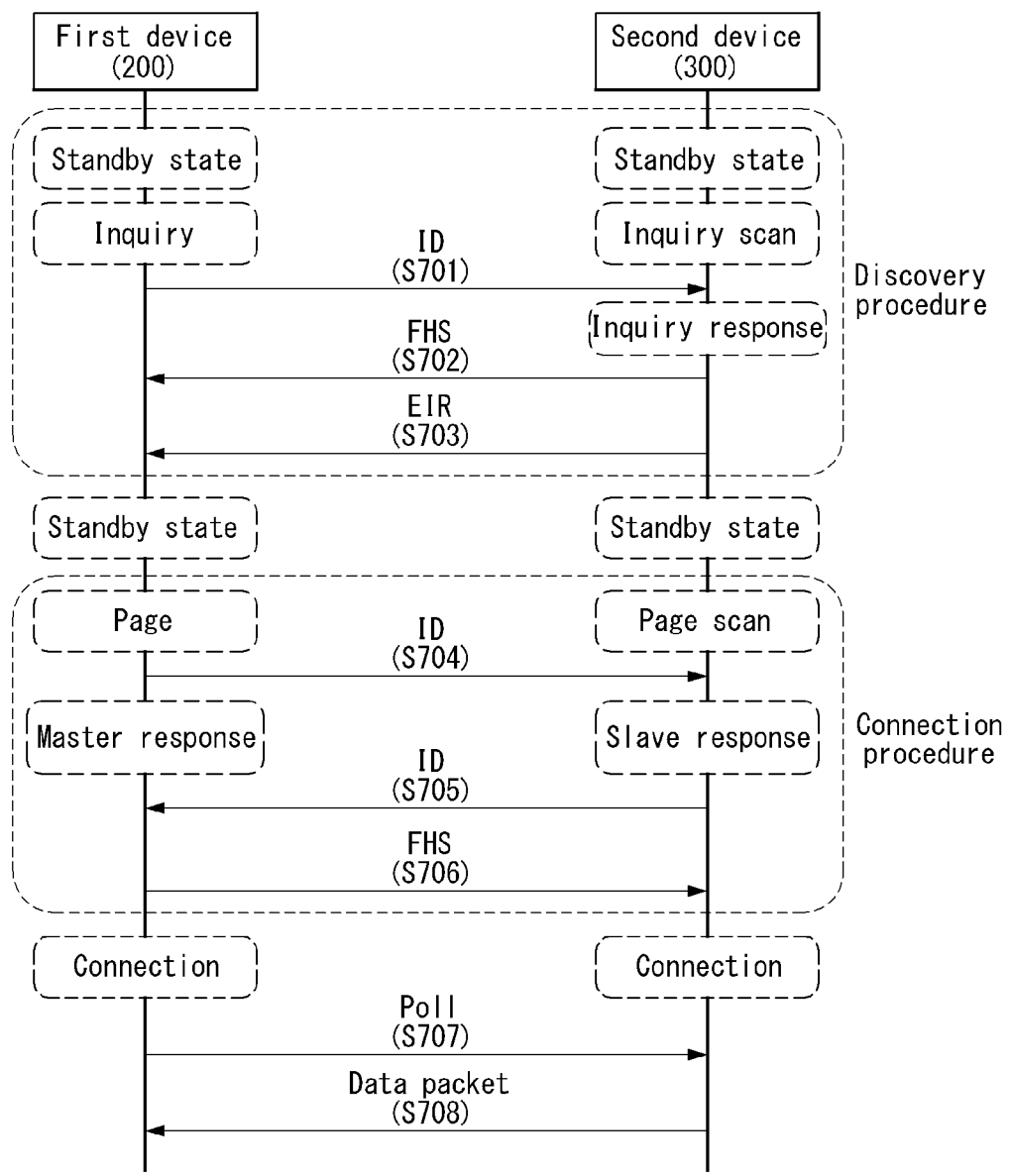

[Fig.8]
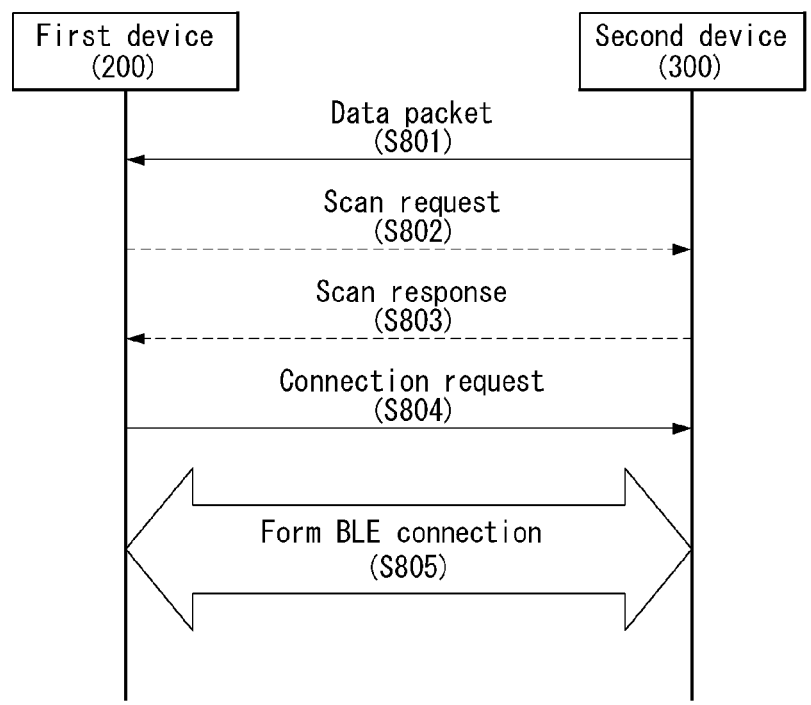

[Fig.9]
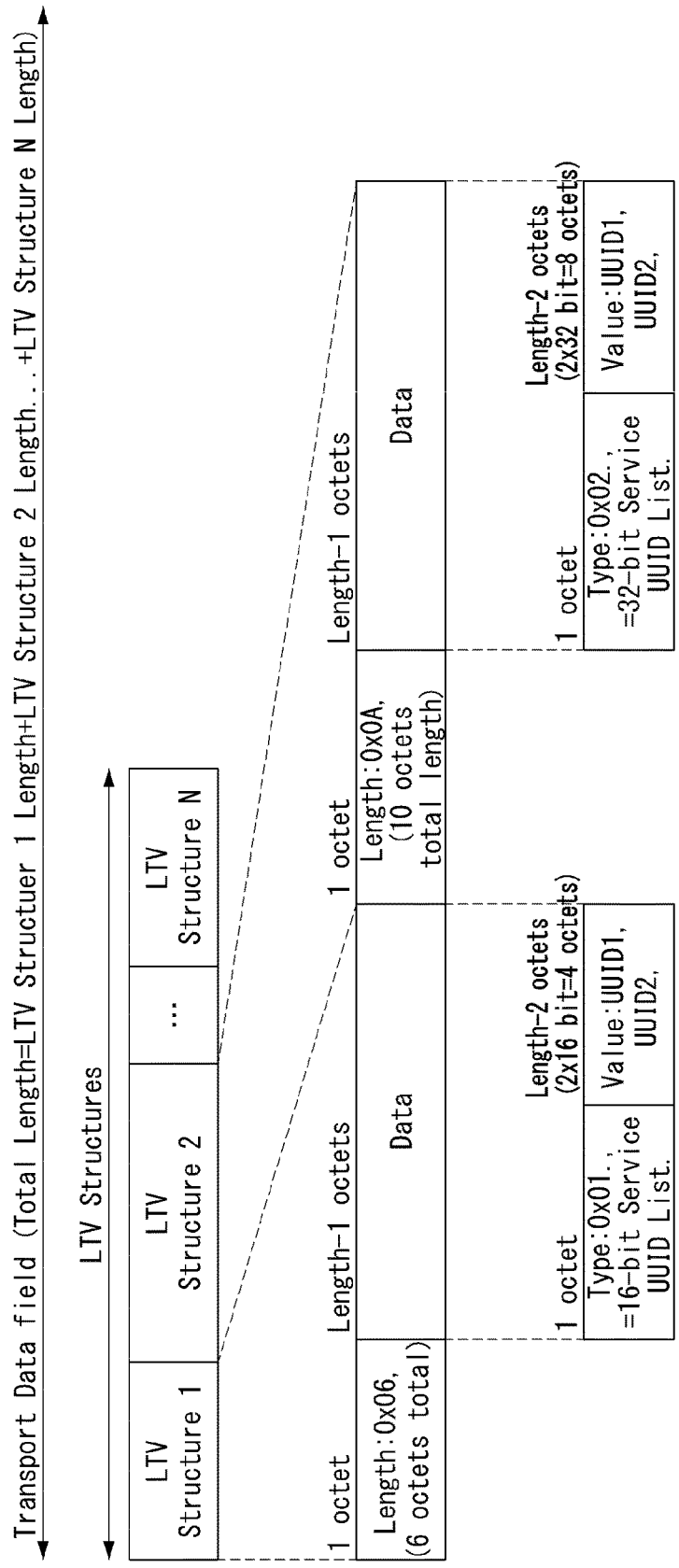

[Fig.10]
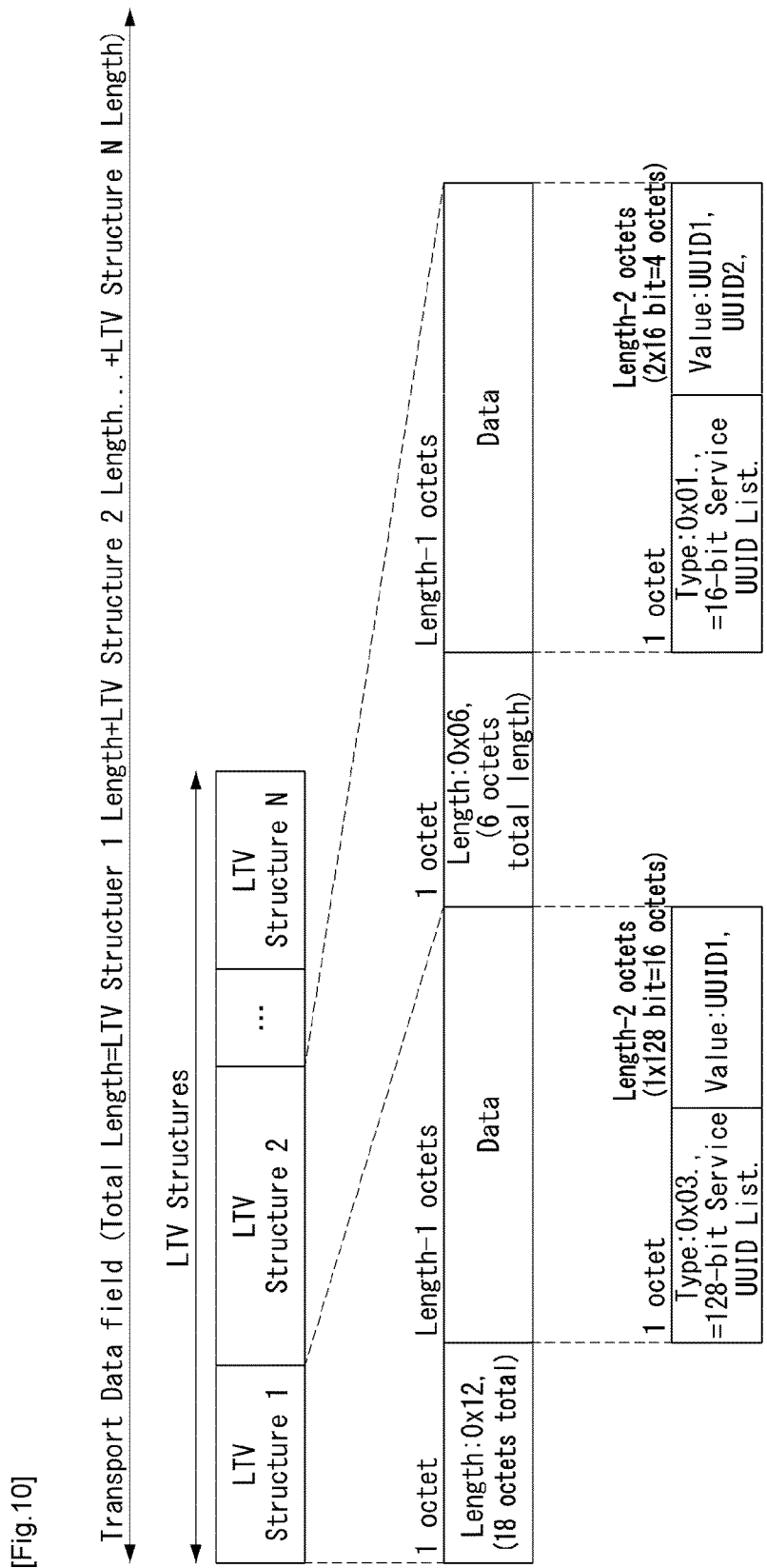

[Fig.11]
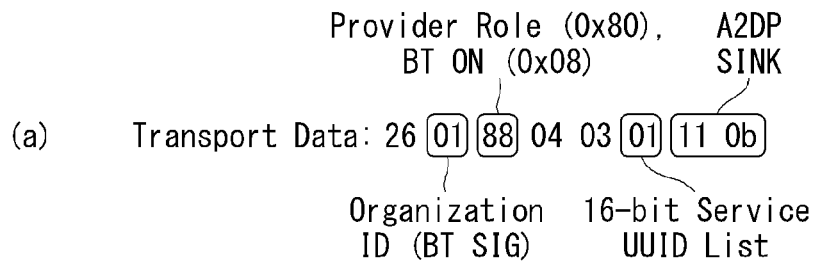
(a)
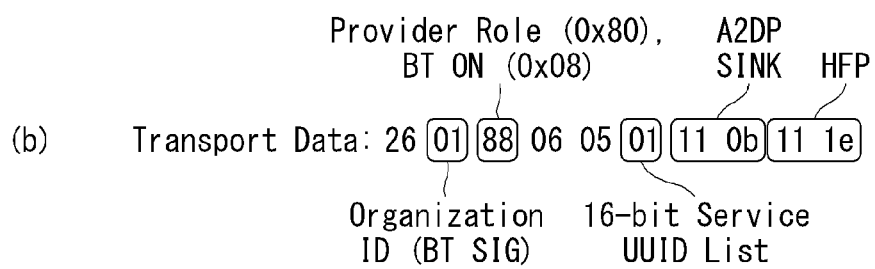
(b)
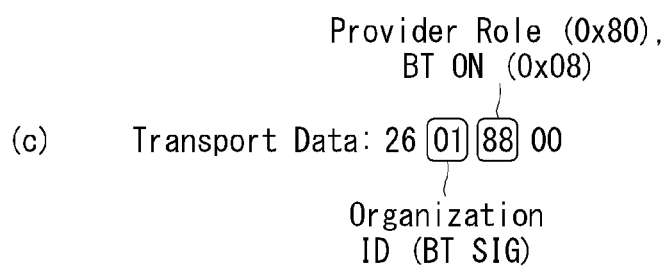
(c)
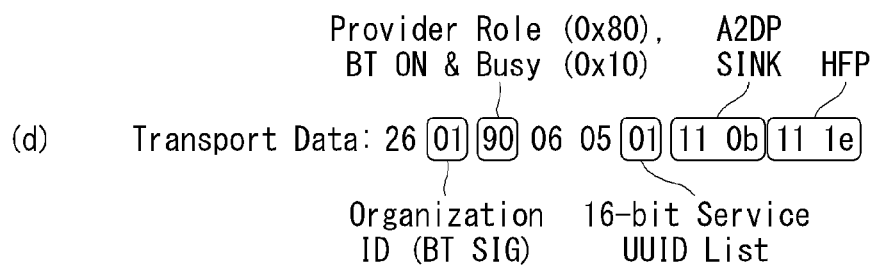
(d)

[Fig.12]

Service Definition

Service Declaration

Attribute Handle
Attribute Type = <<Primary Service>>
Attribute Value = Service UUID (Service name)
Attribute Permission = Read Only, No Authentication/Authorization Characteristic Definition Characteristic Declaration Attribute Handle
Attribute Type = <<Characteristic>>
Attribute Value
 -Characteristic Properties
 -Characteristic Value Attribute Handle
 -Characteristic UUID = <<Characteristic name>>
Attribute Permission = Read Only, No Authentication/Authorization Characteristic Value Declaration Attribute Handle
Attribute Type = <<Characteristic name>>
Attribute Value = Characteristic Value
Attribute Permission = Read Only, No Authentication/Authorization

| Specification Name (Service Name) | Specification Type | Assigned Number (UUID) |
|---|---|---|
| Transport Discovery | org.bluetooth.service.transport_discovery | 0x 1824 |

(b)

| Specification Name (Characteristic Name) | Specification Type | Assigned Number (UUID) | Properties | Permission |
|---|---|---|---|---|
| TDS Control Point | org.bluetooth.characteristic.tds_control_point | 0x 2ABC | Write \| Indicate | Write \| Indicate |

(c)

| Characteristic Name | UUID | Properties | Permission | Description |
|---|---|---|---|---|
| BR-EDR Handover Data | 0x 2C01 (TBD) | Read | Read | |
| Bluetooth SIG Data | 0x 2C02 (TBD) | None | None | |
| Complete BR-EDR Transport Data Descriptor | 0x 2C03 (TBD) | Read | Read | |
| TDS Control Point | 0x 2ABC | Write \| Indicate | Write \| Indicate | Used when BR/EDR, Wi-Fi Interface is trigger |

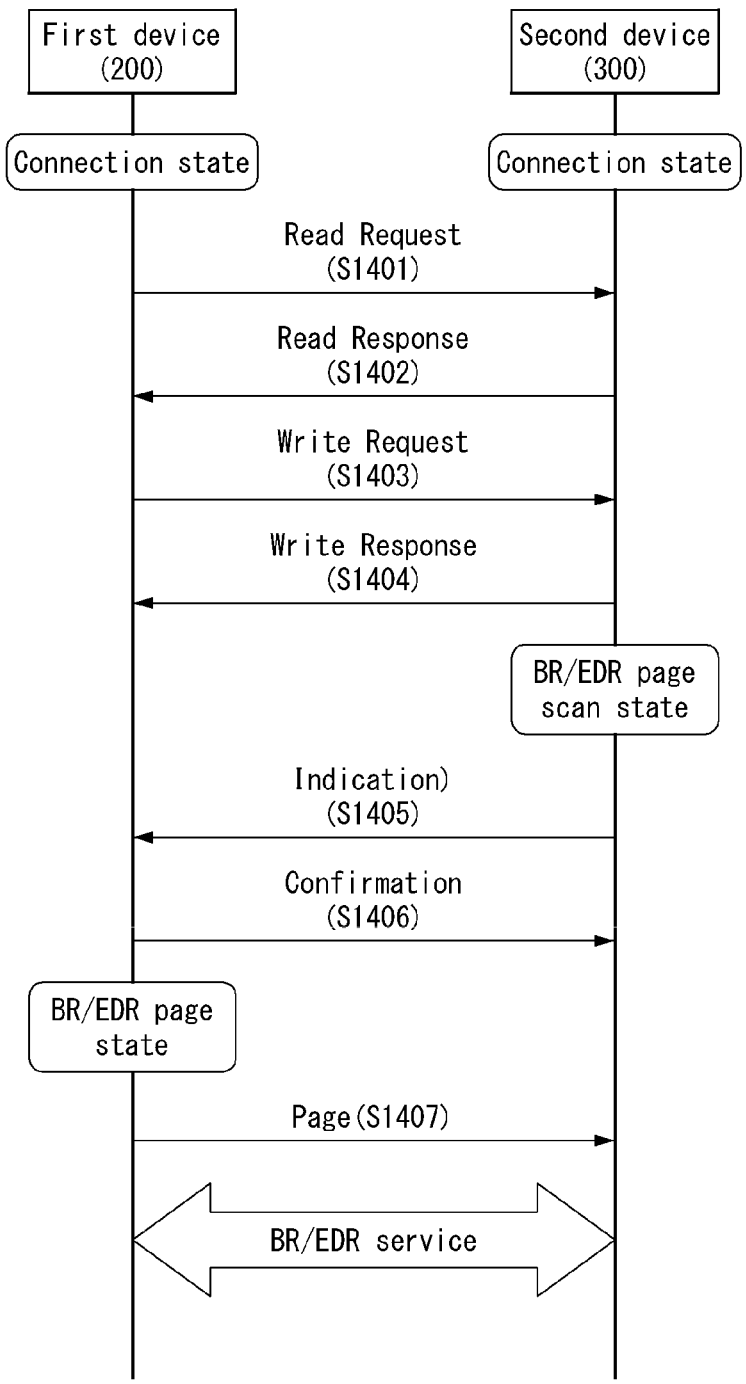
[Fig.14]

[Fig.15]

| Transport Data | Length | uint8 | 0x 03 |
|---|---|---|---|
| | Type | uint8 | 0x 01 <<16-bit Service UUID List>> |
| | Value | List of <<Service UUID>> | 0x110B <<A2DP SINK>> ... |

[Fig.16]

| Result Code | Definition | Description |
|---|---|---|
| 0x00 | Success | Response for successful operation. |
| 0x01 | Op Code Not Supported | Response if unsupported or RFU Op Code is received. |
| 0x02 | Invalid Parameter | Response if Parameter received does not meet the requirements of the higher level specificaion. |
| 0x03 | Unsupported Organization ID | Response if unsupported or RFU Orgenization ID is received. |
| 0x04 | Operation Failed | Response if the requested procedure failed for any reason other than those enumerated in this table. |
| 0x05~0xFF | Reserved For Future Use | |

[Fig.17]
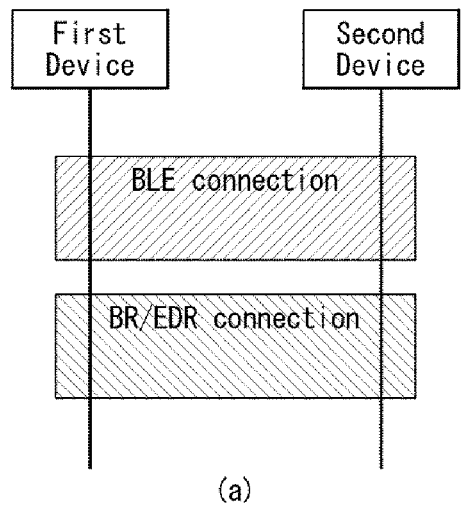
(a)
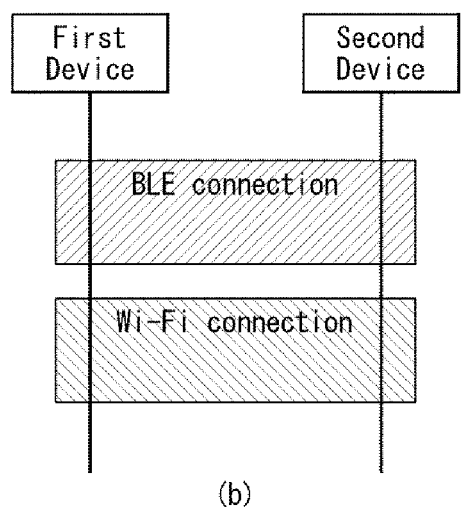
(b)

[Fig.18]

| Fields | | Data Type | Size (octets) | specific data |
|---|---|---|---|---|
| AD Type (TDS) | | uint8 | 1 | 0x 26 《〈TDS AD type〉》 |
| AD Data | Organization ID | uint8 | 1 | 0x FE 《〈Wi-Fi〉》 |
| | TDS Flags | 8bit | 1 | 0b 10 0 ?? 000<br>　　2 bit　　　　1 bit　　　　　　2bit<br>《〈Provider Role \| Additional frame data \| Wi-Fi State〉》 |
| | Transport Data Length | uint8 | 1 | 0x 09 |
| | Type | uint8 | 1 | 0x 02 《〈Wi-Fi AP〉》 |
| | Value | uint8 | 1 | 0x 00 《〈None〉》<br>Device Type |
| | | 8bit | 1 | 0b 1 0 0 00000<br>　1 bit　　1 bit　　　　1 bit　　　1 bit　　　　3 bit<br>《〈Factory Mode \| Current Wi-Fi Mode \| OSC(G1 Only) \| Wi-Fi Connection count〉》<br>　　　　　　　　0: Soft AP, 1: Over AP |
| | | byte | 6 | 0x xx xx xx xx xx xx 《〈Serial Least 6 bytes for Wi-Fi SSID Generation〉》 |

[Fig.19]

| AD Structure 3 (15 octet) | Length (1 octet) | AD Type (1 octet) | AD Data (13 octet) |
|---|---|---|---|
| | 0x0E | 0x26 | |
| | 14 byte | <<TDS>> | |

| Organization ID (1 octet) | TDS Flags (1 octet) | Transport Data Lendth (1 octet) | Transport Data (10 octet) |
|---|---|---|---|
| 0xFE | 0b10000000 | 0x0A | 0x090000... |
| RFU:0x00<br>Bluetooth SIG:0x01<br>Wi-Fi Alliance:0x02<br>Wi-Fi:0xFE<br>RFU:0x02~0xFF | 0~1bits:Frame Role<br>  0b00:Not specified<br>  0b01:Seeker Only<br>  0b10:Provider Only<br>  0b11:Both Seeker and Provider<br>2bit:Data Incomplete<br>  0:False,  1:True<br>3~4bits:Transport State(on/off)<br>  0b00:Off<br>  0b01:On and Available<br>  0b10:On and Temporarily<br>      Unavailable(In case of<br>Wi-Fi, it means connected state)<br>  0b11:RFU<br>5~7bits:Reserved | | |

| Length (1 octet) | Type (1 octet) | Value (8 octet) | | |
|---|---|---|---|---|
| | | Device Type (1 octet) | Setting (1 octet) | Serial (6 octet) |
| 0x09 | 0x02 | 0x00 | 0b10000000 | 0x xx xx xx xx xx xx |
| | 0x00:None<br>0x01:Miracast<br>0x02:Wi-Fi AP | 0x00:None<br>0x01:TV<br>0x02:SPK<br>0x03:Camera<br>0x04~:RFU | 0bit:Factory Mode<br>1bit:Current<br>    Wi-Fi Mode<br>-0:Soft AP<br>-1:Over AP<br>2bit:OSC(C1 Only)<br>3~5bit:Wi-Fi<br>    Connection Count<br>6~7bit:Reserved | Serial<br>:Serial lower<br>6 bytes for Wi-Fi<br>SSID |

[Fig.20]

|  | Length (1 octet) | AD Type (1 octet) | AD Data (9 octet) |
|---|---|---|---|
| Sample | 0x0E | 0x26 | Below table |
| Description | 14 octet | <<Transport Discovery Data>> | Transport Block |

|  | Organization ID (1 octet) | TDS Flags (1 octet) | Transport Data Lendth/Data |
|---|---|---|---|
| Sample | 0xFE | 0b 10 00 000 | Below table |
| Description | Wi-FI:0xFE | Provider (Bits0_1:0b 10) Transport Data Incoplete: Flase (Bit2:0b 0) Transport State: Off (Bit3_4:0b 00) RUF (Bit5_7:0b 000) | Transport Data Lendth/Data |

|  | Length (1 octet) | Data Type (1 octet) | Device Type | Device Setting | Serial #1 (6byte) | Serial #2 (6byte) |
|---|---|---|---|---|---|---|
| Sample | 0x09 | 0x02 | 0x00 | 0b10000000 | 0x xx xx xx xx xx xx | 0x xx xx xx xx xx xx |
| Description | Length 9 octet | Wi-Fi AP | None | 0bit:Factory Mode 1bit:Current Wi-Fi Mode _0:Soft AP _1:Over AP 2bit:OSC (C1 Only) 3~5bit:Wi-Fi Connection Count 6~7bit:Reserved | ID of provider (if device operates as Soft AP) | ID of AP to which optional provider is connected (if device operates as Over AP is also connected to AP) |

| | Length (1 octet) | Data Type (1 octet) | Device Type | Setting | Serial #1 (6byte) | |
|---|---|---|---|---|---|---|
| Sample | 0x09 | 0x02 | 0x00 | 0b10000000 | 0x xx xx xx xx xx xx | |
| Description | Length 9 octet | Wi-Fi AP | None | 1bit:Current Wi-Fi Mode<br>_0:Soft AP<br>_1:Over AP | ID of provider<br>(if device operates<br>as Soft AP) | |

(b)

| | Length (1 octet) | Data Type (1 octet) | Device Type | Setting | Serial #1 (6byte) | BSSID (6byte) |
|---|---|---|---|---|---|---|
| Sample | 0x0F | 0x02 | 0x00 | 0b10000000 | 0x xx xx xx xx xx xx | 0x xx xx xx xx xx xx |
| Description | Length 15 octet | Wi-Fi AP | None | 1bit:Current Wi-Fi Mode<br>_0:Soft AP<br>_1:Over AP | ID of provider<br>(if device operates<br>as Soft AP) | BSSID of provider<br>(if device operates<br>as Soft AP) |

[Fig.22]

| | Length (1 octet) | Data Type (1 octet) | Device Type | Setting | Serial #1 (6byte) |
|---|---|---|---|---|---|
| Sample | 0x09 | 0x02 | 0x00 | 0b11000000 | 0x xx xx xx xx xx |
| Description | Length 9 octet | Wi-Fi AP | None | 1bit:Current Wi-Fi Mode<br>_0:Soft AP<br>_1:Over AP | ID of provider<br>(if device operates<br>as Soft AP) |

(a)

| | Length (1 octet) | Data Type (1 octet) | Device Type | Setting | Serial #1 (6byte) | BSSID (6byte) |
|---|---|---|---|---|---|---|
| Sample | 0x0F | 0x02 | 0x00 | 0b11000000 | 0x xx xx xx xx xx | 0x xx xx xx xx xx xx |
| Description | Length 15 octet | Wi-Fi AP | None | 1bit:Current Wi-Fi Mode<br>_0:Soft AP<br>_1:Over AP | ID of provider<br>(if device operates<br>as Soft AP) | ID of connected AP<br>of provider<br>(if device operates<br>as Over AP is also<br>connected to AP) |

(b)

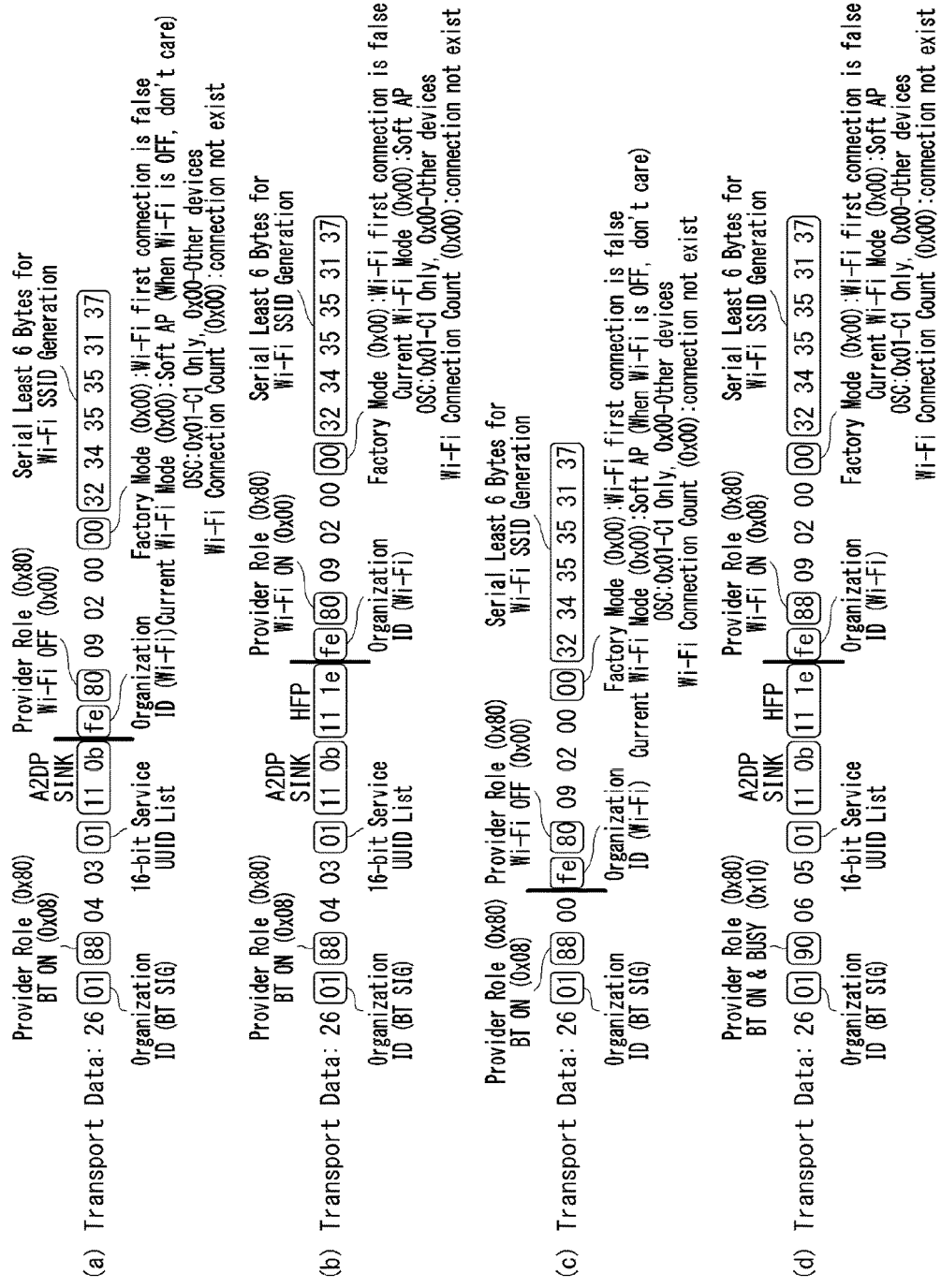

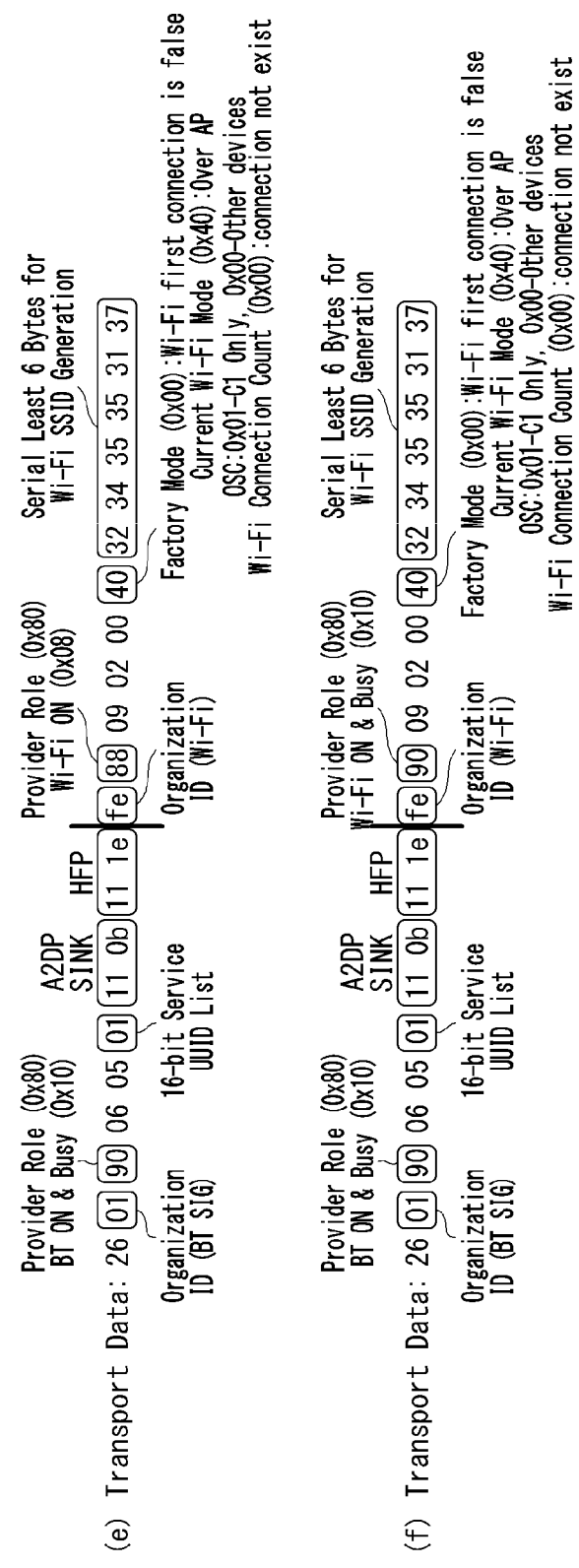

[Fig.25]

| Fields | | | | Data Type | Size (octets) | specific data |
|---|---|---|---|---|---|---|
| AD Type(TDS) | | | | uint8 | 1 | 0x 26 <<TDS AD type>> |
| AD Data | BT Frame | Organization ID | | uint8 | 1 | 0x 01 <<Bluetooth SIG>> |
| | | TDS Flags | | 8bit | 1 | 0b 10 0 ?? 000<br>2 bit    1 bit    2bit<br><<Provider Role \| Additional frame data \| BT State>> |
| | | Length | | uint8 | 1 | 0x 04 |
| | | Transport Data | Length | uint8 | 1 | 0x 03 |
| | | | Type | uint8 | 1 | 0x 01 <<16-bit Service UUID List>> |
| | | | Value | List of <<Service UUID>> | 2, 4, or 16 octets for each UUID listed | 0x 110B <<ex. A2DP SINK>> ... |
| | Wi-Fi Frame | Organization ID | | uint8 | 1 | 0x FE <<Wi-Fi>> |
| | | TDS Flags | | 8bit | 1 | 0b 10 0 ?? 000<br>2 bit    1 bit    2bit<br><<Provider Role \| Additional frame data \| Wi-Fi State>> |
| | | Length | | uint8 | 1 | 0x 09 |
| | | Transport Data | Type | uint8 | 1 | 0x 02 <<Wi-Fi AP>> |
| | | | Value | uint8 | 1 | 0x 00 <<None>><br>Device Type |
| | | | | 8bit | 1 | 0b 1 0 0 00000<br>1 bit  1 bit  1 bit    3 bit<br><<Factory Mode \| Current Wi-Fi Mode \| OSC(GI Only) \| Wi-Fi Connection count>><br>0: Soft AP, 1: Over AP |
| | | | | byte | 6 | 0x xx xx xx xx xx xx <<Serial Least 6 bytes for Wi-Fi SSID Generation>> |

[Fig.26]

| Characteristic Name | UUID | Properties | Permission | Description |
|---|---|---|---|---|
| Wi-Fi Handover Data | 0x 2D01 (TBD) | Read | Read | Used when Wi-Fi Pass Phrase is obtained |
| Wi-Fi Alliance Data | 0x 2D02 (TBD) | None | None | |
| Complete Wi-Fi Transport Data Descriptor | 0x 2D03 (TBD) | Read | Read | |
| Handover Control Point | 0x 2ABC | Write \| Indicate | Write \| Indicate | Used when BR/EDR, Wi-Fi Interface is trigger |

[Fig.27]
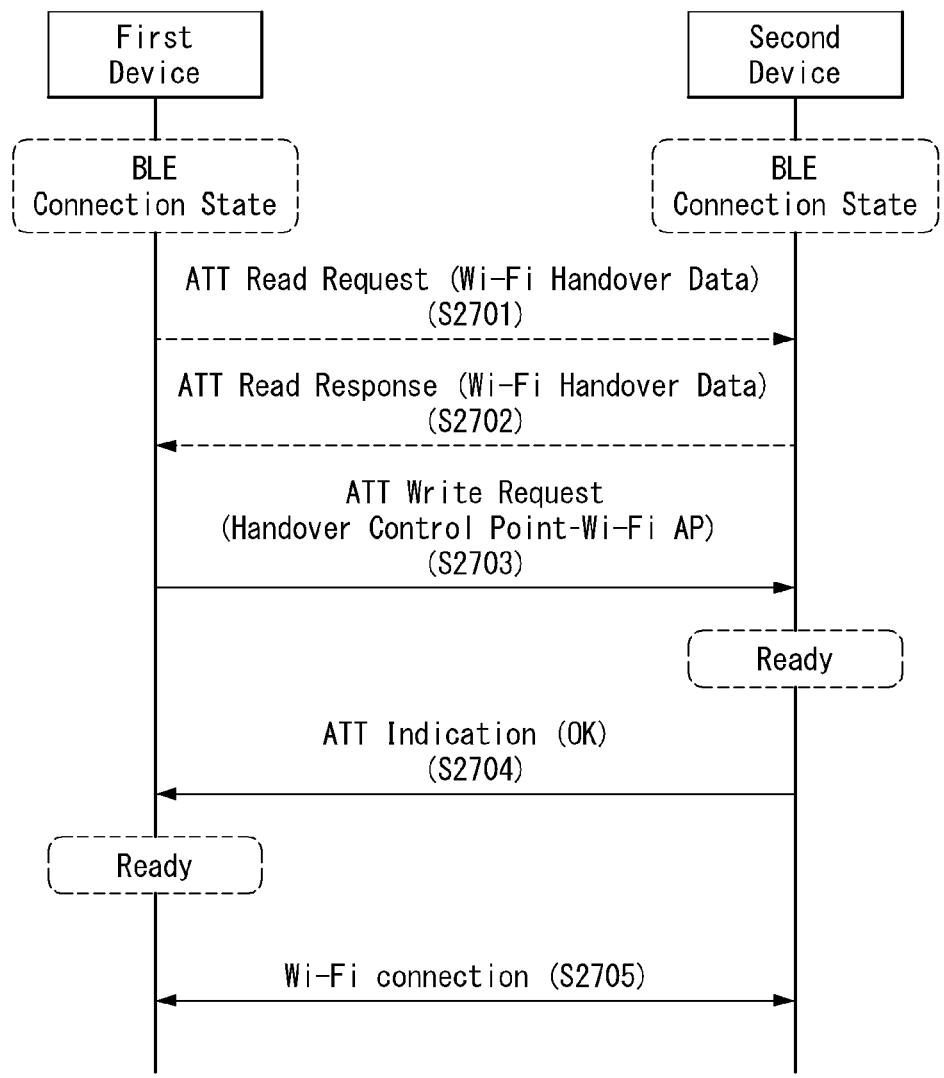

|  | Length (1 octet) | Type (1 octet) | Value (1 octet) |
|---|---|---|---|
| Sample | 0x 02 | 0x 01 | 0x 01 |
| Description |  | 0x 01:Mode(soft/Over) | soft AP 0x01<br>Over AP 0x02 |

(b)

|  | Length (1 octet) | Type (1 octet) | Value (1 octet) |
|---|---|---|---|
| Sample | 0x 02 | 0x 02 | 0x 01 |
| Description |  | 0x 02:Service | Pre-view Service (0x01) |

(c)

|  | Length (1 octet) | Type (1 octet) | Value (1 octet) |
|---|---|---|---|
| Sample | 0x 07 | 0x 03 | 0x 45:FE:33:11:33:77 |
| Description |  | 0x 03:Target AP ID | ID of Target AP |

[Fig.29]

|  | Length (1 octet) | Type (1 octet) | Value (1 octet) |
|---|---|---|---|
| Sample | 0x 07 | 0x 03 | 0x 45:FE:33:11:33:77 |
| Description |  | 0x 03:Target AP | ID of Target AP |

[Fig.30]
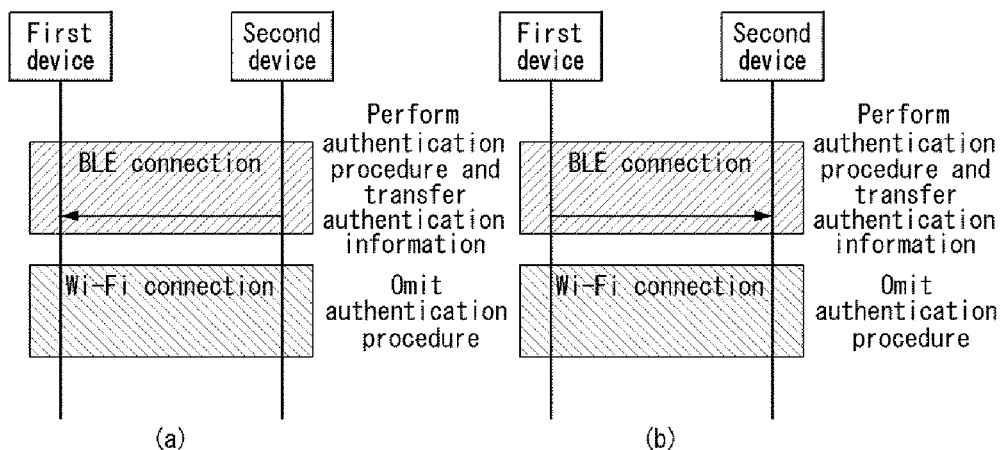
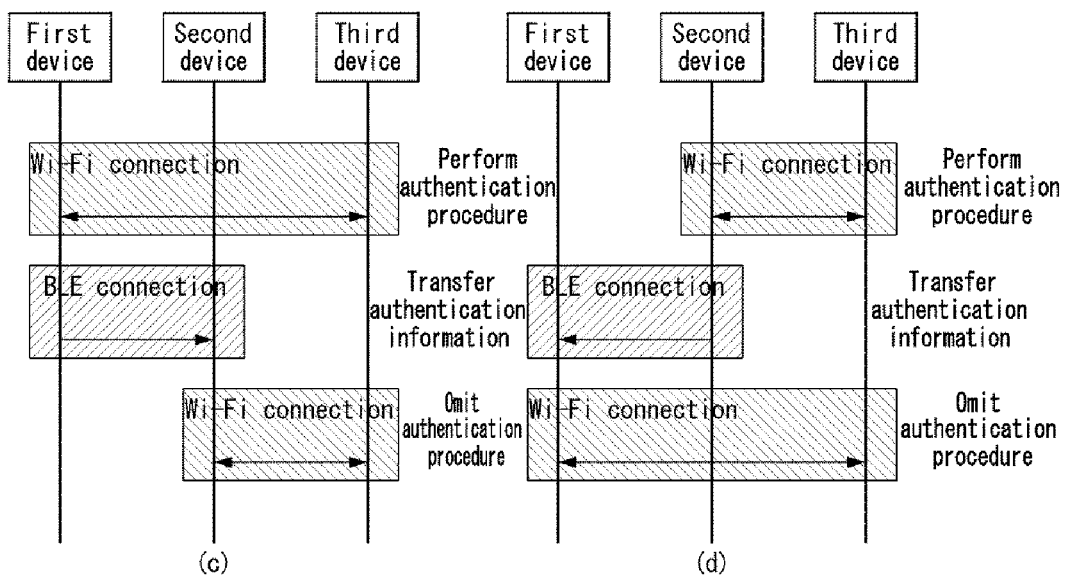

[Fig.31]
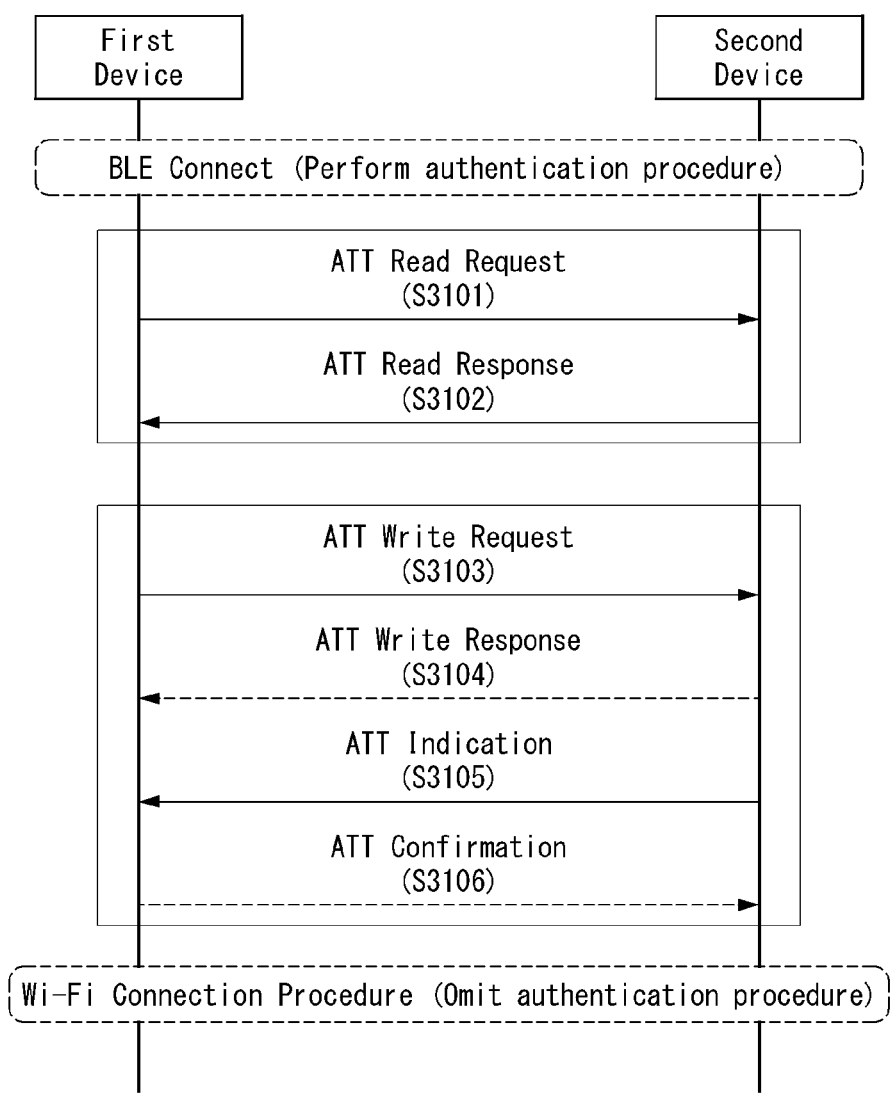

[Fig.32]
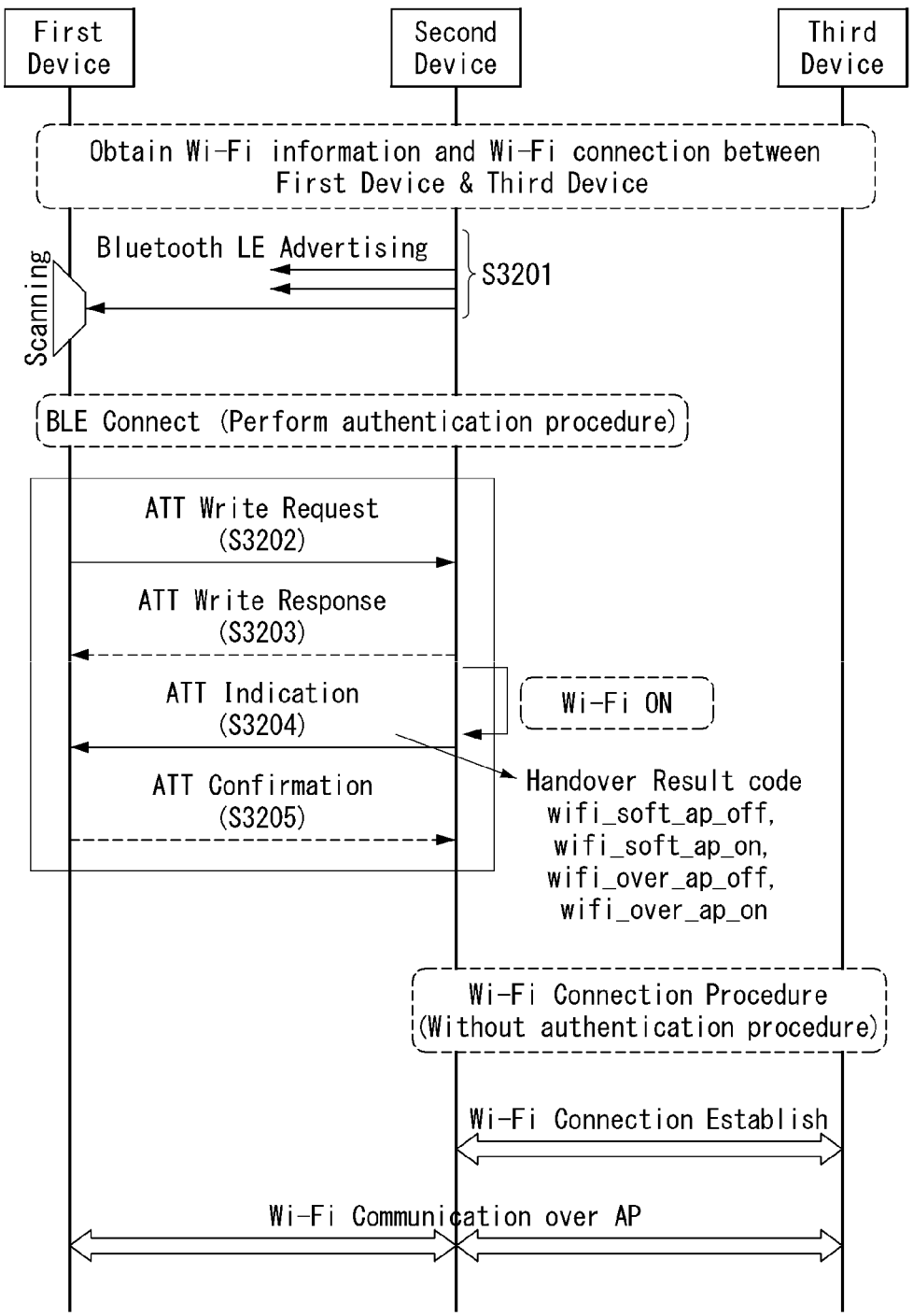

[Fig.33]
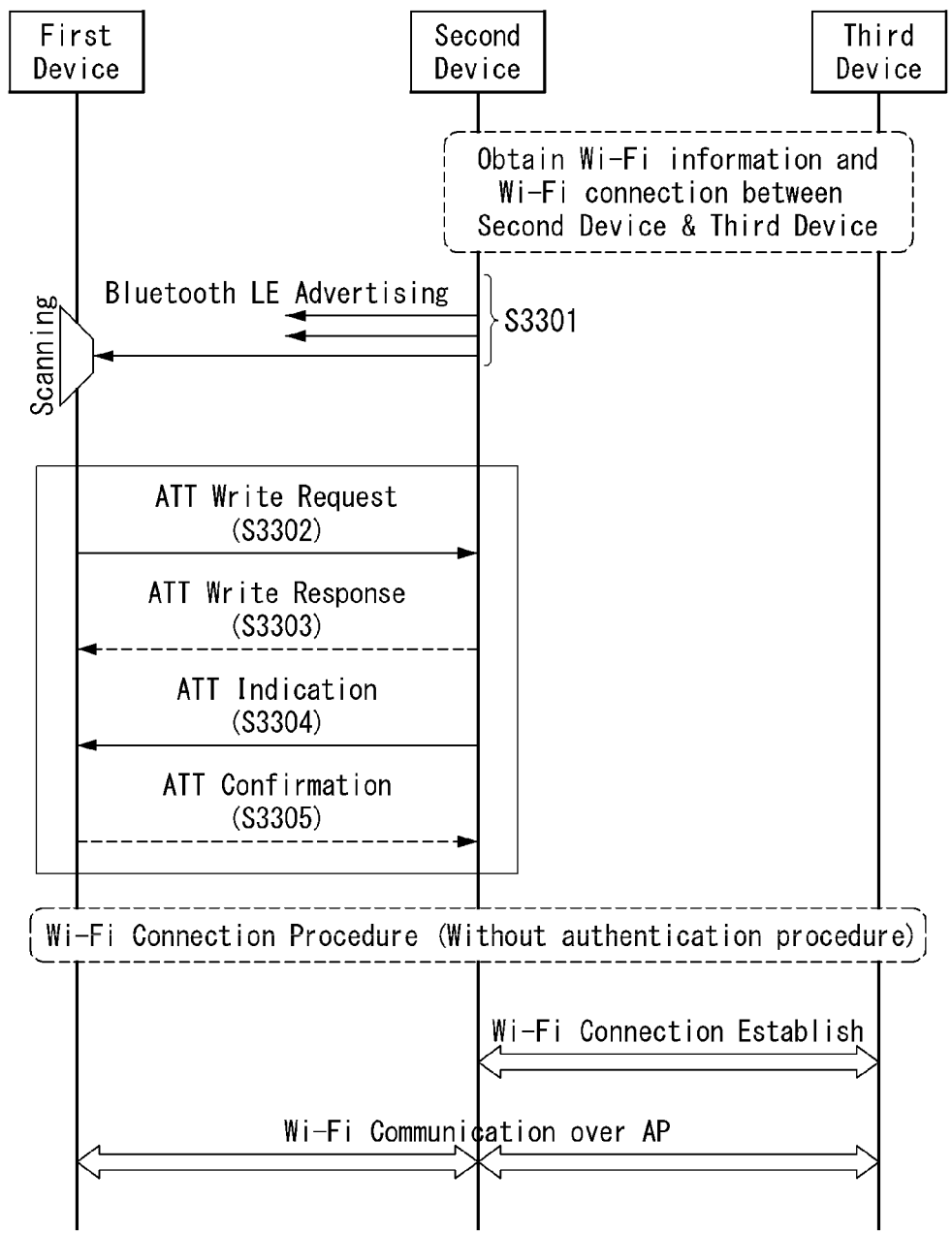

[Fig.34]
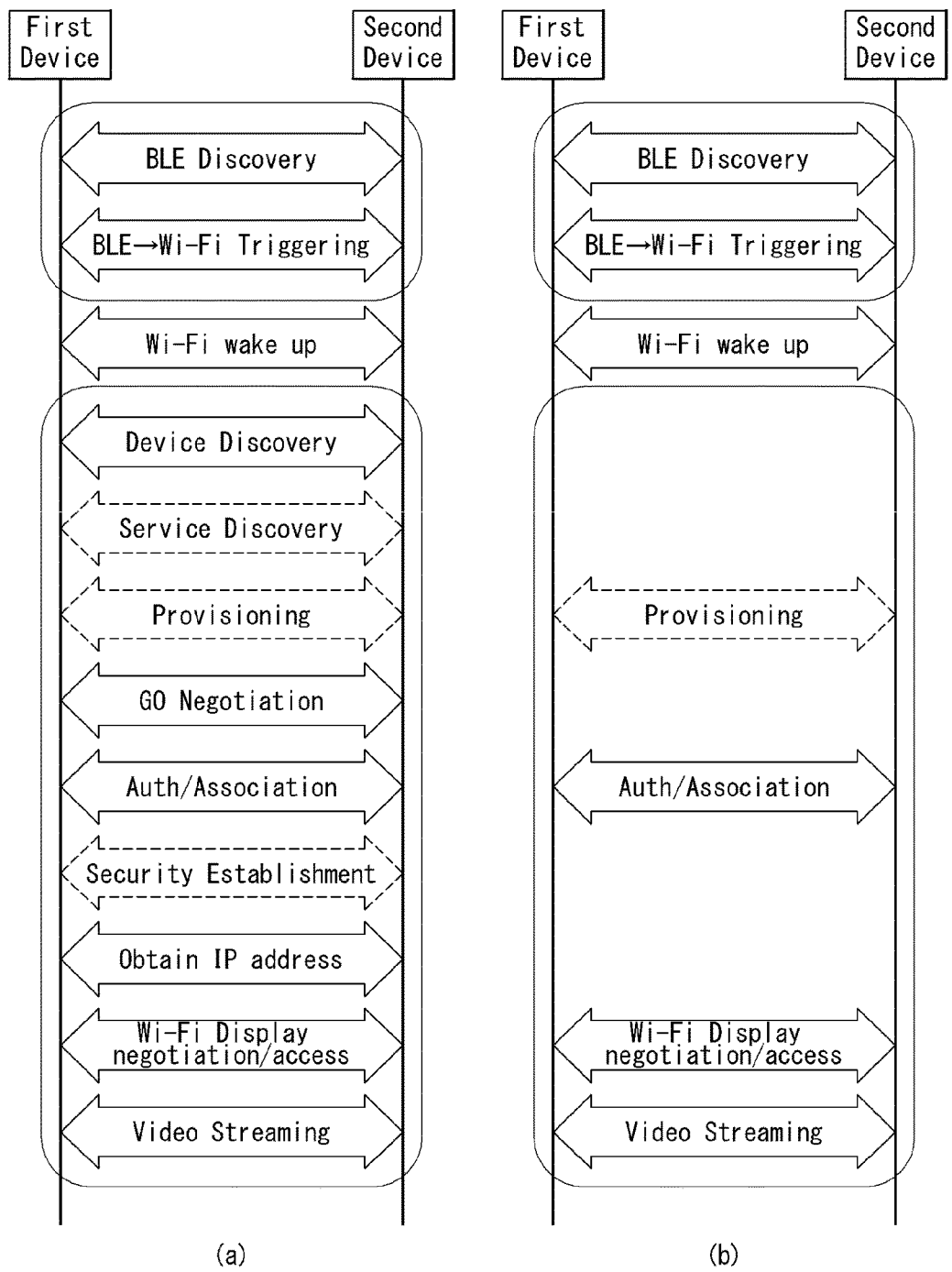

METHOD AND APPARATUS FOR CONTROLLING A DEVICE USING BLUETOOTH TECHNOLOGY

CROSS-REFERENCE TO RELATED APPLICATION

This application priority to Provisional Application No. 62/281,740 filed on 22 Jan. 2016 in US the entire contents of which is hereby incorporated by reference in its entirety.

BACKGROUND OF THE INVENTION

Field of the Invention

The present invention relates to a method and apparatus for connecting alternative communication means using Bluetooth, that is, a short-distance technology, in a wireless communication system, and more specifically, to a method and apparatus for connecting a Bluetooth BR/EDR or Wi-Fi using a Bluetooth low energy (BLE) technology and providing a service.

Discussion of the Related Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

If a device supporting all of a Bluetooth BR/EDR method, a Wi-Fi method, and a Bluetooth LE method in a wireless communication system attempts to perform wireless communication, the device has to previously determine to perform the wireless communication using which one of the Bluetooth BR/EDR method, the Wi-Fi method, and the Bluetooth LE method.

Furthermore, a device attempting to perform wireless communication using a determined method has to perform discovery, connection, and data exchange procedures.

However, to determine whether to perform wireless communication using which method deteriorates user convenience because it requires high knowledge for a wireless communication technology.

Furthermore, the Bluetooth BR/EDR method and the Wi-Fi method require high consumption power for discovery, connection, and data exchange procedures compared to the Bluetooth LE method.

Accordingly, there is a need for a method for easily recognizing a wireless communication method and a method for forming a Bluetooth BR/EDR connection or a Wi-Fi connection through low consumption power.

Accordingly, in order to solve such problems, an embodiment of the present invention provides a method for checking whether each device supports Bluetooth BR/EDR or Wi-Fi through Bluetooth LE and which service can be provided and for performing a Bluetooth BR/EDR connection or a Wi-Fi connection.

Furthermore, an embodiment of the present invention proposes a method for minimizing power necessary to discover a device using Bluetooth LE.

Furthermore, an existing Wi-Fi handover method has problems in that user convenience is low and the time that it takes to perform a Wi-Fi connection is long because an authentication procedure is unnecessarily performed dually.

Accordingly, in order to solve such problems, an embodiment of the present invention proposes a method for exchanging Wi-Fi authentication information through Bluetooth LE and omitting or simplifying a Wi-Fi authentication procedure in a Wi-Fi connection step.

Furthermore, an embodiment of the present invention proposes a method for mediating in a Wi-Fi connection between devices so that the Wi-Fi connection is formed through Bluetooth LE.

Technical objects to be achieved by the present invention are not limited to the aforementioned objects, and those skilled in the art to which the present invention pertains may evidently understand other technological objects from the following description.

In an aspect of the present invention, there is provided a method for forming a Wi-Fi connection between a second device and a third device using Bluetooth low energy (LE) in a wireless communication system. The method is performed by a first device and includes receiving an advertising message from the second device, forming a Bluetooth LE connection with the second device based on the advertising message, transmitting a first write request message to the second device requesting writing of authentication information necessary for performing Wi-Fi authentication with the third device, wherein the first write request message includes the authentication information, receiving a write response message from the second device in response to the first write request message, and transmitting a second write request message to request the writing of Opcode indicating a Wi-Fi connection with the third device. The second write request message may include identification information for identifying the third device, and the Wi-Fi connection may be formed between the second device and the third device based on the authentication information.

The authentication information may include at least one of a network key, a basic service set identifier (BSSID), a service set identifier (SSID), a pass phrase, or an algorithm used for authentication.

The advertising message may include distance information indicating a threshold distance in which data can be transmitted and received through the Bluetooth LE. The second write request message may be transmitted when the first device is within the threshold distance.

The advertising message may include state information indicating the ON or OFF of the Wi-FI, service list information indicating at least one service capable of being provided through the Wi-Fi, and identification information for identifying the second device.

If the state information indicates OFF, the second write request message may include control information indicating the activation of the Wi-Fi.

The method may further include receiving an indication message including result information indicating the state of the success of the Wi-Fi connection or a failure of the Wi-Fi connection attributable to a specific reason from the second device in response to the second write request message.

In another aspect of the present invention, there is provided a first device forming a Wi-Fi connection between a second device and a third device using Bluetooth low energy (LE) in a wireless communication system, including a communication unit configured to perform communication with an outside in a wired or wireless manner and a processor functionally connected to the communication unit. The processor is configured to receive an advertising message from the second device, form a Bluetooth LE connection with the second device based on the advertising message, transmit a first write request message to the second device requesting writing of authentication information necessary for performing Wi-Fi authentication with the third device, wherein the first write request message includes the authentication information, receive a write response message from the second device in response to the first write request message, and transmit a second write request message to the second device requesting writing of Opcode indicating a Wi-Fi connection with the third device. The second write request message may include identification information for identifying the third device, and the Wi-Fi connection may be formed between the second device and the third device based on the authentication information.

In another aspect of the present invention, there is provided a method for forming a Wi-Fi connection using Bluetooth low energy (LE) in a wireless communication system. The method is performed by a first device and includes receiving an advertising message from a second device, forming a Bluetooth LE connection with the second device based on the advertising message, transmitting a read request message to the second device requesting reading of authentication information related to Wi-Fi authentication, receiving a read response message including the authentication information from the second device ain response to the read request message, transmitting a write request message to request the writing of Opcode indicating a Wi-Fi connection to the second device, and forming the Wi-Fi connection with the second device based on the authentication information.

The authentication information may include at least one of a network key, a basic service set identifier (BSSID), a service set identifier (SSID), a pass phrase, or an algorithm used for authentication.

The advertising message may include distance information indicating a threshold distance in which data may be capable of transmitted and received through the Bluetooth LE, and the write request message may be transmitted when the first device is within the threshold distance.

The advertising message may include state information indicating the ON or OFF of the Wi-FI, service list information indicating at least one service capable of being provided through the Wi-Fi, or ID information for identifying the second device.

If the state information indicates OFF, the write request message may include control information indicating the activation of the Wi-Fi.

The method may further include receiving an indication message including result information indicating the state of the success of the Wi-Fi connection or a failure of the Wi-Fi connection attributable to a specific reason from the second device in response to the write request message.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic view illustrating an example of a wireless communication system using a Bluetooth low energy technology to which the present invention is applicable.

FIG. 2 shows an example of the internal block diagram of a device to which an embodiment of the present invention may be applied.

FIG. 3 is a view illustrating an example of a Bluetooth low energy topology.

FIGS. 4 and 5 are diagrams showing examples of Bluetooth communication architecture to which an embodiment of the present invention may be applied.

FIG. 6 is a diagram showing an example of the structure of a Generic Attribute Profile (GATT) for Bluetooth LE.

FIG. 7 is a diagram showing a discovery and connection procedure using the Bluetooth BR/EDR.

FIG. 8 is a diagram showing a discovery and connection procedure using Bluetooth LE.

FIGS. 9 to 11 are embodiments to which the present invention may be applied and are diagrams illustrating the transport data of a device supporting Bluetooth BR/EDR.

FIG. 12 is a diagram showing an example of a generic attribute profile (GATT) structure using Bluetooth LE.

FIG. 13 is a diagram showing an example of a data format which may be used in services and characteristics for Bluetooth BR/EDR handover.

FIGS. 14 to 16 are diagrams showing a method for performing a Bluetooth BR/EDR connection through Bluetooth LE and data formats to which an embodiment of the present invention is applied.

FIG. 17 is an embodiment to which the present invention may be applied and is a diagram showing a method for performing a Bluetooth BR/EDR connection through Bluetooth LE.

FIGS. 18 to 20 are embodiments to which the present invention may be applied and are diagrams showing examples of an advertising packet for searching for a device supporting Wi-Fi Transport through Bluetooth LE.

FIGS. 21 and 22 are embodiments to which the present invention may be applied and are diagrams showing examples of data formats according to Wi-Fi mode.

FIGS. 23 and 24 are embodiments to which the present invention may be applied and show detailed examples of transport data including information related to a Wi-Fi service.

FIGS. 25 and 26 are diagrams showing examples of data formats which may be used for services and characteristics for Wi-Fi handover.

FIGS. 27 to 29 are diagrams showing a method for performing a Wi-Fi connection through Bluetooth LE and examples of data formats to which an embodiment of the present invention is applied.

FIG. 30 is an embodiment to which the present invention may be applied and is a diagram showing a method for forming a Wi-Fi connection between devices through Bluetooth LE.

FIG. 31 is an embodiment to which the present invention may be applied and is a diagram showing a method for forming a Wi-Fi connection between devices through Bluetooth LE.

FIG. 32 is an embodiment to which the present invention may be applied and is a diagram showing a method for forming a Wi-Fi connection between devices through Bluetooth LE.

FIG. 33 is an embodiment to which the present invention may be applied and is a diagram showing a method for forming a Wi-Fi connection between devices through Bluetooth LE.

FIG. 34 is a diagram for illustrating effects according to the formation of a Wi-Fi connection between devices through Bluetooth LE in accordance with an embodiment of the present invention.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, the present invention proposes a method for measuring human beings' exercising activities through the fitness equipment and transmitting and processing measured data through Bluetooth LE to provide the processed data to users.

FIG. 2 shows an example of the internal block diagram of a device to which an embodiment of the present invention may be applied.

As shown in FIG. 2, a device 200 proposed by an embodiment of the present invention may include a network interface 210, a display unit 220, a user input interface 230, a control unit 240, a multimedia module 250, storage 260, a memory unit 270, and a power supply unit 280.

The network interface 210, the display unit 220, the user input interface 230, the control unit 240, the multimedia module 250, the storage 260, the memory unit 270, and the power supply unit 280 are functionally connected to perform a method proposed by this specification.

The network interface 210 refers to an apparatus that enables the device to perform wired or wireless communication with another device, and may include an energy efficient interface 212 and a legacy interface 214.

The energy efficient Interface 212 is an apparatus for low power wireless communication having low energy consumption, and refers to a unit (or a module) for discovering another device to be connected to the device or enabling data transmission.

The legacy interface 214 is an apparatus for wireless communication, and refers to a unit (or a module) for discovering another device to be connected to the device and enabling data transmission.

The network interface may also be called a communication unit.

The display unit 220 refers to a unit (or a module) for outputting data received through the network interface 210 or data stored in the storage 260 under the control of the control unit 240.

The control unit 240 refers to a module for controlling an overall operation of the device. The control unit 240 may also be expressed as a control unit, a processor or a controller.

The control unit 240 may include application-specific integrated circuits (ASICs), other chipsets, logic circuits and/or data processing devices.

The control unit 240 controls the network interface 210 so that it receives an advertising message from another device, controls the communication unit so that it sends a scan request message to another device and receives a scan response message in response to the scan request from another device, and controls the network interface so that it sends a connection request message to the server device for a Bluetooth connection with another device.

Furthermore, after a Bluetooth LE connection is established through the connection procedure, the control unit 240 controls the communication unit so that it reads or writes data from or in another device using the attribute protocol.

The multimedia module 250 is a unit (or module) for the playback of a variety of types of multimedia. The multimedia module 250 may be implemented within the control unit 240 or separately.

The storage 260 is a unit implemented in a variety of types of devices, and refers to a unit of a nonvolatile property which is capable of storing a variety of types of data.

The memory unit 270 is a unit implemented in a variety of types of devices, and refers to a unit of a volatile property in which a variety of types of data is temporarily stored.

The memory unit 270 may include read-only memory (ROM), random access memory (RAM), flash memory, a memory card, a storage medium and/or other storage devices.

The wireless communication network 210 may include a baseband circuit for processing a radio signal. When an embodiment is implemented in software, the aforementioned scheme may be implemented using a module (or process or function) for performing the aforementioned function. The module may be stored in the memory unit 270 or the storage 260 and executed by the processor.

The memory unit 270 may be disposed inside or outside the control unit 240 and may be connected to the control unit 240 by well-known means.

The power supply unit 280 refers to a module for being supplied with external power, internal power under the control of the control unit 240 and supplying power for the operation of each element.

As described above, the BLE technology has a low duty cycle and can significantly reduce power consumption through a low data transfer rate. Accordingly, the power supply unit can supply power for the operation of each element even with low output power (e.g., 10 mW or less).

The user input interface 230 refers to a module which provides a user input to the control unit 240 along with a screen button so that a user can control the operation of the device.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIGS. 4 and 5 are diagrams showing examples of Bluetooth communication architecture to which an embodiment of the present invention may be applied.

Referring to FIGS. 4 and 5, FIG. 4(a) shows an example of a Bluetooth basic rate (BR)/enhanced data rate (EDR) protocol stack, and FIG. 4(b) shows an example of a Bluetooth low energy (LE) protocol stack.

Furthermore, FIG. 5(c) shows an example of dual mode architecture for supporting both the Bluetooth BR/EDR and the Bluetooth LE.

More specifically, as shown in FIG. 4(a), the Bluetooth BR/EDR protocol stack may include an upper host stack 20 and a lower controller stack 10 on the basis of a host controller interface (HCI) 14.

The controller stack 10 refers to a wireless transmission and reception module for receiving a Bluetooth signal of 2.4 GHz and hardware for sending or receiving a Bluetooth packet. The host stack 20 is connected to a Bluetooth module, and controls the Bluetooth module and performs an operation.

The controller stack 10 may include a BR/EDR PHY layer 11, a BR/EDR baseband layer 12, and a link manager layer 13.

The BR/EDR PHY layer 11 is a layer for sending and receiving a radio signal of 2.4 GHz. If Gaussian frequency shift keying (GFSK) modulation is used, the BR/EDR PHY layer 11 may send data by hopping 79 RF channels.

The BR/EDR Baseband layer 12 is responsible for a function for sending a digital signal, and selects a channel sequence that is hopped 1,400 times per second and sends a time slot of 625 us in length for each channel.

The link manager layer 13 controls an overall operation (e.g., link setup, control, and security) for a Bluetooth connection using a link manager protocol (LMP).

The link manager layer 13 may perform the following functions.

The link manager layer 16 may perform ACL/SCO logical transport, logical link setup, and control
  Detach: The link manager layer 16 stops connection and informs a counterpart device about the reason for stopping connection.
  The link manager layer 16 performs power control and role switch.
  The link manager layer 16 performs security (authentication, pairing, encryption) function.

The host controller interface layer 14 provides an interface between the host stack and the controller stack so that a host can provide a command and data to a controller and the controller can provide an event and data to the host.

The host stack (or host module) 20 includes a logical link control and adaptive protocol (L2CAP) 21, a BR/EDR protocol 22, a generic access profile (GAP) 23, and a BR/EDR profile 24.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The BR/EDR protocol 22 and the BR/EDR profile 24 define a service (or profile) using the Bluetooth BR/EDR and defines an application protocol for the exchange of such data. The generic access profile (GAP) 23 defines a device discovery, connection, and security level.

The Bluetooth LE protocol stack shown in FIG. 4(b) includes a controller stack 30 capable of operating to process a wireless device interface whose timing is important and a host stack 40 capable of operating to process high level data.

First, the controller stack 30 may be implemented using a communication module which may include a Bluetooth wireless device, for example, a processor module which may include a processing device, such as a microprocessor.

The host stack 40 is part of an OS operating on the processor module and may be implemented as the instantiation of a package on the OS.

In some instances, the controller stack and the host stack may be driven or executed on the same processing device within the processor module.

The controller stack 30 includes a physical layer (PHY) 31, a link layer (LL) 32, and a host controller interface (HCI) 33.

The physical layer (PHY or a wireless transmission and reception module) 31 is a layer for sending and receiving a radio signal of 2.4 GHz, and uses GFSK modulation and a frequency hopping scheme including 40 RF channels.

The link layer 32 that functions to send or receive a Bluetooth packet performs advertising and scanning functions using 3 advertising channels, and provides a function for generating a connection between devices and exchanging data packets of a maximum of 257 bytes through 37 data channels.

The host stack 40 may include a logical link control and adaptive protocol (L2CAP) 41, a security manager (SM) 42, an attribute protocol (ATT) 43, a generic attribute profile (GATT) 44, a generic access profile (GAP) 45, and an LE profile 46. The host stack 40 is not limited to the protocols and profiles, but may include various protocols and profiles.

The host stack 40 multiplexes various protocols and profiles provided higher Bluetooth using the L2CAP.

First, the L2CAP 41 may provide a single bidirectional channel for sending data to a specific protocol or profile.

The L2CAP 41 may operate to multiplex data between higher layer protocols, to segment and reassemble packages, and to manage multicast data transmission.

In the Bluetooth LE, three basic channels (e.g., one for a signaling CH, one for a security manager, and one for an attribute protocol) are basically used. Furthermore, a dynamic channel may be used, if necessary.

In contrast, in the BR/EDR, a dynamic channel is basically used. A protocol service multiplexer, retransmission, streaming mode, etc. are supported.

The security manager (SM) 42 is a protocol for authenticating a device and providing a key distribution.

The attribute protocol (ATT) 43 is a server-client structure, and defines a rule for accessing the data of a counterpart device. The ATT has the following 6 message types (i.e., Request, Response, Command, Notification, indication, and Confirmation).

Request and Response message: A request message is a message for a client device to request specific information from a server device, and the response message, as a response message with respect to the request message, refers to a message transmitted from the server device to the client device.

Command message: It is a message transmitted from the client device to the server device in order to indicate a command of a specific operation. The server device does not transmit a response with respect to the command message to the client device.

Notification message: It is a message transmitted from the server device to the client device in order to notify an event, or the like. The client device does not transmit a confirmation message with respect to the notification message to the server device.

Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

Service: It defines a basic operation of a device by a combination of behaviors related to data Include: It defines a relationship between services Characteristics: It is a data value used in a server Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method

Time: Time information exchanging method

FindMe: Provision of alarm service according to distance

Proximity: Battery information exchanging method

Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

FIG. 5(*c*) shows dual mode architecture supporting both the Bluetooth BR/EDR and the Bluetooth LE.

An embodiment of the present invention proposes a method for discovering a device that supports the Bluetooth BR/EDR through the Bluetooth LE having small power consumption and establishing a Bluetooth BR/EDR connection by exchanging information for a Bluetooth BR/EDR connection in order to reduce power consumption when a Bluetooth BR/EDR connection is formed in a device that supports both the Bluetooth BR/EDR and the Bluetooth LE.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 6 is a view illustrating an example of a structure of a generic attribute profile (GATT) of Bluetooth low energy.

Referring to FIG. 6, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 6 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method in which a sensor measures and stores human activities by using a GATT-based operational structure of the Bluetooth LE, and a client retrieves the stored information from the sensor.

FIG. 7 is a diagram showing a discovery and connection procedure using the Bluetooth BR/EDR.

Discovery Procedure

A first device 200 and a second device 300 remain in a standby state. For Bluetooth BR/EDR discovery, the first device 200 becomes an inquiry state, and the second device 300 becomes an inquiry scan state.

The first device 200 in the inquiry state sends an ID packet so as to perform a Bluetooth BR/EDR discovery procedure (S701). The first device 200 receives a frequency hop synchronization (FHS) packet from the second device 300 in response to the ID packet (S702).

If the second device 300 attempts to send additional information about the second device 300, it may send the additional information to the first device 200 using an enhanced inquiry packet (EIR) (S703).

If the first device 200 that has checked the presence of another device and information about another device through such a discovery procedure attempts to connect to the second device 300, it performs a paging procedure.

Paging Procedure

In the paging procedure, the first device 200 enters a page state, and the second device 300 enters a page scan state.

The first device 200 in the page state sends an ID packet to the second device 300 (S704).

When the second device 300 receives the ID packet transmitted by the first device, the first device 200 enters the BR/EDR master response state of the BR/EDR page state, and the second device 300 enters the BR/EDR slave state of the BR/EDR page state.

Thereafter, the first device 200 sends a second ID packet in a channel in which the ID packet has been transmitted (S705).

The second device 300 that has received the second ID packet sends a frequency hopping synchronization (FHS) packet to the first device 200 for frequency synchronization (S706).

When the paging procedure is completed, the first device 200 and the second device 300 switch to a BR/EDR connection state.

Thereafter, the second device 300 switches to the hopping pattern of the first device 200. In order to check such switching, the first device 200 sends a Poll packet to the second device 300 (S707). The second device 300 that has received the Poll packet sends a data packet to the first device 200 in response to the Poll packet (S708). Accordingly, the Bluetooth BR/EDR connection procedure is terminated.

Such a procedure is performed when devices attempt to perform wireless communication through the Bluetooth BR/EDR. Such a procedure has problems in that whether the first device and the second device support the Bluetooth BR/EDR must be previously checked and that a required service can be used only when a Bluetooth BR/EDR connection is formed and communication is performed using the Bluetooth BR/EDR.

Furthermore, the Bluetooth BR/EDR has a disadvantage in that the time for Bluetooth LE versus device discovery is long and power consumption is great.

Accordingly, in order to solve the problems, an embodiment of the present invention provides a method for rapidly checking whether several devices or a device having a designated device address supports the Bluetooth BR/EDR through the Bluetooth LE and that the several devices or the device can provide which service with low power and performing a Bluetooth BR/EDR connection.

Furthermore, the present invention is not limited thereto, and proposes a method which is used to connect Wi-Fi, that is, alternative communication means, through Bluetooth LE.

In other words, the present invention provides a method for checking whether each device supports Wi-Fi through Bluetooth LE and checking whether each device can provide which service through Wi-Fi and for performing a Wi-Fi connection.

Furthermore, the present invention provides a method for exchanging information related to Wi-Fi authentication through Bluetooth LE and rapidly connecting Wi-Fi by performing a simplified connection procedure.

FIG. 8 is a diagram showing a discovery and connection procedure using Bluetooth LE.

Referring to FIG. 8, a second device 300 may notify surrounding devices of its presence by sending an advertising message to the surrounding devices using the aforementioned three advertising channels (S801).

In this case, the second device 300 sends the advertising message by hopping the three advertising channels at its time intervals.

A first device 200 that has received the advertising message transmitted by the second device 300 may search for the second device 300, and sends a scan request message to the second device 300 if it wants to request additional information (S802).

The second device 300 sends a scan response message, including the additional information, to the first device 200 in response to the scan request message (S803).

If the first device 200 wants to form a Bluetooth LE connection with the second device 300, it sends a connection request message to the second device 300 (S804) and forms the Bluetooth LE connection through the synchronization of timing information with the second device (S805).

A device supporting Bluetooth BR/EDR transport sends an advertising message, including transport data related to BR/EDR transport, in order to perform a transport discovery service.

A provider may notify a seeker of a service list which may be executed using BR/EDR transport through transport data. The transport data is described below with reference to the following drawings.

FIGS. 9 to 11 are embodiments to which the present invention may be applied and are diagrams illustrating the transport data of a device supporting Bluetooth BR/EDR.

Referring to FIGS. 9 and 10, the transport data may be configured to have a length, type and value (LTV) structure.

Referring to FIG. 9, transport data may include two LTV structures.

One LTV structure may indicate a 16-bit service UUID list (Type 0x01) in a type field and indicate two detailed 16-bit service UUIDs in a Value field.

The other LTV structure may indicate a 32-bit service UUID list (Type 0x02) in a type field and two detailed 32-bit service UUIDs in a Value field.

Furthermore, the remaining data may be omitted for clarity.

Referring to FIG. 10, transport data may include two LTV structures.

In this case, one LTV structure may indicate a 128-bit service UUID list (Type 0x03) in a type field and indicate one detailed 128-bit service UUID in a Value field.

The other LTV structure may indicate a 16-bit service UUID list (Type 0x01) in a type field and indicate two detailed 16-bit service UUIDs in a Value field.

Furthermore, the remaining data may be omitted for clarity.

FIG. 11 shows a detailed example of transport data including information related to a BR/EDR service.

If one 16-bit service is supported and the supported service is an advanced audio distribution profile (A2DP) SINK service, transport data may be configured as illustrated in FIG. 11(a).

If two 16-bit services are supported and the supported services include an advanced audio distribution profile (A2DP) SINK service and a hands-free profile (HFP), transport data may be configured as illustrated in FIG. 11(b).

In the case of a BLE-only device not supporting a BE/EDR service, transport data may be configured as illustrated in FIG. 11(c).

If two 16-bit services are supported and the supported services include an advanced audio distribution profile (A2DP) SINK service and a hands-free profile (HFP), but the services are not available, transport data may be configured as illustrated in FIG. 11(d).

FIG. 12 is a diagram showing an example of a generic attribute profile (GATT) structure using Bluetooth LE.

A Bluetooth generic attribute profile (GATT) defines a method for exchanging data using a service and/or characteristic between Bluetooth LE devices.

A command for a characteristic by which data may be transmitted from a server device to a client device or from a client device to a server device is provided through the GATT. The command may designate the UUID of the characteristic or the value of the command may be read through a handle value provided by an information search command.

Furthermore, the GATT may provide notification and display. A client device may request the notification of a specific characteristic from a server device. A server device may send a corresponding value to a client device whenever the value is available.

Furthermore, one service may be configured to have a plurality of characteristics.

One characteristic includes one value and n descriptors, and each of the descriptors describes the value of a characteristic.

In an embodiment of the present invention, information about a wireless communication interface is stored in a device as the GATT structure. Information about the stored GATT structure may be read from or transmitted by a counterpart device.

FIG. 13 is a diagram showing an example of a data format which may be used in services and characteristics for Bluetooth BR/EDR handover.

FIG. 13(a) shows a data format for a transport discovery service (TDS), and FIGS. 13(b) and 13(c) show data formats having characteristics for Bluetooth BR/EDR handover.

FIGS. 14 to 16 are diagrams showing a method for performing a Bluetooth BR/EDR connection through Bluetooth LE and examples of data formats to which an embodiment of the present invention is applied.

Referring to FIGS. 14 to 16, after Bluetooth LE is connected through the Bluetooth LE procedure described with reference to FIG. 8, a first device 200 may connect Bluetooth BR/EDR by instructing a second device 300 to connect alternative communication means through the Bluetooth LE.

More specifically, the first device 200 and the second device 300 may form a Bluetooth LE connection through the Bluetooth LE procedure described with reference to FIG. 8.

Thereafter, if additional information related to the Bluetooth BR/EDR connection is required, the first device 200 sends a read request message for requesting the additional information to the second device (S1401).

The read request message is a message for requesting information stored in the GATT database of the second device 300.

The first device 200 receives the requested additional information from the second device 300 through a read response message in response to the read request message (S1402).

Thereafter, the first device 200 may send a write request message, including control information, to the second device 300 in order to indicate the ON of Bluetooth BR/EDR, that is, an alternative communication technology to be connected, and the activation of a service (S1403).

At this time, the first device 200 may request the writing of a "Handover Control Point" characteristic through the write request message in order to indicate the ON of the Bluetooth BR/EDR and the activation of the service.

The control information may include operation code (Opcode) for indicating a specific operation for the second device and a parameter value therefor. Furthermore, the parameter may include the transport data of the Bluetooth BR/EDR. FIG. 15 shows an example of the transport data.

At this time, the first device 200 may request the activation of some or all of services which may be supported by the second device 300 through the write request message.

The first device 200 may receive a write response message in response to the write request message (S1404).

The write response message may include result code for the write request message, such as that shown in FIG. 16.

The second device 300 activates the ON of the Bluetooth BR/EDR, that is, alternative communication means, and the service in response to the instruction of the first device 200. In this case, the second device 300 may activate only some or all of the services instructed by the first device 200.

Thereafter, the second device 300 becomes a Bluetooth BR/EDR page scan state, and may send an indication message to the first device 200 (S1405).

If the instruction of the first device 200 has been normally performed, the second device 300 may send the indication message to the first device 200 as ACK.

The indication message may include activation information indicating an activated service of a plurality of services because if the first device 200 has requested the activation of the plurality of services, only some of the plurality of requested services may be activated.

The first device sends a confirmation message to the second device 300 in response to the indication message, and becomes a BR/EDR page state (S1406).

Thereafter, the first device 200 sends a page message to the second device 300 (S1407) and provides the services through the Bluetooth BR/EDR.

Power consumption can be reduced and the time taken for a connection can be reduced because Bluetooth BR/EDR is connected through Bluetooth LE, that is, low power communication means, as described above.

FIG. 17 is an embodiment to which the present invention may be applied and is a diagram showing a method for performing a Bluetooth BR/EDR connection through Bluetooth LE.

Referring to FIG. 17(*a*), a first device (or seeker) and a second device (or provider) may perform handover to a Bluetooth BR/EDR connection in a Bluetooth LE connection state.

In this case, the first device and the second device may perform an authentication procedure in a BLE connection step and omit an authentication procedure in a subsequent BR/EDR connection step or may omit an authentication procedure in a BLE connection step and perform an authentication procedure in a subsequent BR/EDR connection step.

For example, the first device and the second device may perform an authentication procedure using a Pass key entry method in a BLE connection state and may omit an authentication procedure using a method, such as Just work or out-of-band (OOB), in a BR/EDR connection step.

The Pass key entry method may be used if one of two devices does not have a display device capable of displaying a six-digit number, but has an input device, whereas the other device has a display device capable of displaying a six-digit number.

Furthermore, the Just work method may be used if at least one of two devices does not have a display device capable of displaying a six-digit number and not have an input device through which a six-digit number cannot be entered.

Furthermore, the OOB method may be used if an Out Of mechanism (e.g., NFC) for searching for a remote device and supporting the exchange of cryptographic numbers to be used in a pairing process is used.

In contrast, a Numeric Comparison method may be used if both devices have a display device capable of displaying a six-digit number and both the devices have an input device through which "yes" or "no" can be selected.

For example, the first device and the second device may omit an authentication procedure using the Just work method in a BLE connection state, and may perform an authentication procedure using a method, such as the Pass key entry method, in a BR/EDR connection step.

Referring to FIG. 17(*b*), a first device (or seeker) and a second device (or provider) may perform handover to Wi-Fi in a Bluetooth LE connection state.

In this case, the first device and the second device may perform an authentication procedure in a BLE connection step and omit an authentication procedure in a subsequent Wi-Fi connection step or may omit an authentication procedure in a BLE connection step and perform an authentication procedure in a subsequent Wi-Fi connection step.

For example, the first device and the second device may perform an authentication procedure in the Pass key entry method in a BLE connection state and omit an authentication procedure using the OOB method in a Wi-Fi connection step.

Furthermore, for example, the first device and the second device may omit an authentication procedure using the Just work method in a BLE connection state and perform an authentication procedure using a method, such as a pass phrase method, in a Wi-Fi connection step.

FIGS. 18 to 20 are embodiments to which the present invention may be applied and are diagrams showing examples of an advertising packet for searching for a device supporting Wi-Fi Transport through Bluetooth LE.

Referring to FIG. 18, a provider device on which Wi-Fi Transport has been mounted may configure a TDS advertising structure (or an advertising packet) as illustrated in FIG. 18, and may send the TDS advertising structure.

In this case, "0x26" written in an AD Type field indicates that TDS-related information will be described in AD Data. Furthermore, an Organization ID indicates that information to be contained in the AD Data is related to which Transport. As shown in FIG. 18, if 0xFE is written in the Organization ID field, it indicates that information related to Wi-Fi Transport has been included in the AD Data.

Furthermore, a TDS flag field may indicate the state of Transport (i.e., Wi-Fi in FIG. 18) that has been designated to be described in the Organization ID field and information about whether Transport-related information has been included in the advertising packet.

Furthermore, FIGS. 19 and 20 are AD structures which may be included in an advertising packet, and show transport discovery data including related information in Wi-Fi Transport.

As described above, what information to be contained in the AD Data is information related to Wi-Fi Transport may be indicated through the Organization ID field. Furthermore, the state of Wi-Fi Transport may be indicated through the TDS Flag field.

Furthermore, as described above, transport data may have an LTV structure and include additional information related to Wi-Fi.

Furthermore, transport data may include a serial value according to a method of using Wi-Fi Transport. This is described in detail later.

In an advertising state, a first device (or seeker) may check a service executable using Wi-Fi Transport by confirming a TDS AD structure provided by a second device (or provider).

A device that plays the role of a seeker checks whether Wi-Fi Transport is supported nor not and a service executable using Wi-Fi Transport by confirming a TDS AD structure provided by a device that plays the role of a provider.

Furthermore, a service may be used through Wi-Fi Transport depending on a user selection. In this case, a seeker device may activate the Wi-Fi Transport for a provider device using BLE and instruct the provider device to execute a specific service.

In order to perform handover to Wi-Fi Transport, a seeker has to confirm the ID (e.g., an SSID, a serial or a BSSID) of the Wi-Fi Transport of a provider.

The seeker may check information related to the Wi-Fi Transport through an advertising packet. If information related to advertising packet Wi-Fi Transport is not all obtained (or checked), the seeker may additionally exchange information related to the Wi-Fi Transport using a Wi-Fi handover data characteristic.

If there is a marginal space in the advertising packet, the provider may insert the following information into the advertising packet.

If a seeker operates as a soft AP: It indicates that a seeker operates as an AP. SSID and/or Serial information is provided so that a provider can check the ID of Wi-Fi Transport of the seeker.

If a provider operates as a soft AP: It indicates that a provider operates as an AP. An SSID, Serial information is provided so that the ID of Wi-Fi Transport can be checked. A BSSID is provided so that a Wi-Fi Transport connection can be attempted.

If a seeker operates as an Over AP: It indicates that a seeker has been first connected to an AP. In this case, a provider may form a Wi-Fi connection with the AP connected to the seeker and perform communication with the seeker through Wi-Fi. SSID and/or Serial information is provided so that the provider can check the ID of Wi-Fi Transport of the AP connected to the seeker.

If a provider operates as an Over AP: It indicates that a provider has been first connected to an AP. In this case, a seeker may form a Wi-Fi connection with the AP connected to the provider and perform communication with the provider through Wi-Fi. SSID and/or Serial information is provided so that the ID of Wi-Fi Transport can be checked, and the BSSID of the AP is provided so that the seeker can directly attempt a Wi-Fi Transport connection.

FIGS. 21 and 22 are embodiments to which the present invention may be applied and are diagrams showing examples of data formats according to Wi-Fi mode.

Referring to FIG. 21, if a provider operates as a soft AP, the provider may include information, indicating that current Wi-Fi mode has been set as soft AP mode, in an advertising packet.

Furthermore, the ID of the provider may be included in a serial field as illustrated in FIG. 21(a), or the ID of the provider may be included in a serial field and the BSSID of the provider may be additionally included in a BSSID field as illustrated in FIG. 22(b).

Referring to FIG. 22(a), if a seeker has been first connected to an AP, the seeker may operate as an Over AP. In this case, a provider may send an advertising packet including information indicating that current Wi-Fi mode is over AP mode and information about the ID of the provider.

Referring to FIG. 22(b), if a provider has been first connected to an AP, the provider may operate as an Over AP. In this case, the provider may send an advertising packet, including information indicating that current Wi-Fi mode is over AP mode, information about the ID of the provider (a serial field), and information about the ID of the AP connected to the provider (a BSSID field).

FIGS. 23 and 24 are embodiments to which the present invention may be applied and show detailed examples of transport data including information related to a Wi-Fi service.

If one 16-bit service is supported, the supported service is an advanced audio distribution profile (A2DP) SINK service, and Wi-Fi is an OFF state, transport data may be configured as illustrated in FIG. 23(a).

If two 16-bit services are supported, the supported services are an advanced audio distribution profile (A2DP) SINK service and a hands-free profile (HFP), and Wi-Fi is an ON (soft AP) state, transport data may be configured as illustrated in FIG. 23(b).

If a device is a BLE-only device not supporting a BE/EDR service and Wi-Fi is an OFF state, transport data may be configured as illustrated in FIG. 23(c).

If two 16-bit services are supported, the supported services are an advanced audio distribution profile (A2DP) SINK service and a hands-free profile (HFP), and the services are not available, transport data may be configured as illustrated in FIGS. 23(d), 24(e), and 24(f).

In the case of a Wi-Fi ON and a soft AP state, transport data may be configured as illustrated in FIG. 23(d). In the case of a Wi-Fi ON and an over AP state, transport data may be configured as illustrated in FIG. 24(e). In the case of a Wi-Fi ON and an over AP state, but if a Wi-Fi service is not available, transport data may be configured as illustrated in FIG. 24(f).

FIGS. 25 and 26 are diagrams showing examples of data formats which may be used for services and characteristics for Wi-Fi handover.

A provider device on which Wi-Fi Transport has been mounted may configure a TDS advertising structure (or an advertising packet) as illustrated in FIG. 25 and send it.

Furthermore, FIG. 26 illustrates the data format of characteristics for Wi-Fi handover. Furthermore, in the case of Wi-Fi handover, the data formats of services and characteristics illustrated in FIGS. 13(a) and 13(b) may be used.

FIGS. 27 to 29 are diagrams showing a method for performing a Wi-Fi connection through Bluetooth LE and examples of data formats to which an embodiment of the present invention is applied.

Referring to FIGS. 27 to 29, after Bluetooth LE is connected through the Bluetooth LE procedure described with reference to FIG. 8, a first device (or seeker) may connect Wi-Fi by instructing a second device (or provider) to connect alternative communication means through Bluetooth LE.

More specifically, the first device and the second device may form a Bluetooth LE connection through the Bluetooth LE procedure described with reference to FIG. 8.

Thereafter, if additional information related to a Wi-Fi connection is necessary, the first device sends a read request message to request the additional information to the second device (S2701).

The read request message is a message for requesting information stored in the GATT database of the second device.

The first device receives the requested additional information from the second device through a read response message, that is, a response to the read request message (S2702).

For example, the second device may provide information, such as the ID (e.g., a serial, a service set identifier (SSID) or a basic service set identifier (BSSID)) of Wi-Fi Transport, to the first device through the read response message.

Furthermore, the read request message and the read response message may include handover-related information of an LTV format.

In this case, a value that may be indicated through a Type field and information indicated by the corresponding value may be illustrated in Table 2 below.

TABLE 2

| Type Value (1octet) | Type | Value Example |
|---|---|---|
| 0x01 | Mode | Soft AP or Over AP |
| 0x02 | Service | Service that may be provided |
| 0x03 | Target AP ID | 6-byte BSSID of AP |
| 0x04 | Wi-Fi of Target AP Authentication information | Wi-Fi authentication of AP information |
| 0x05 | Its own Wi-Fi ID | 6-byte BSSID |
| 0x06 | Its own Wi-Fi Authentication information | Its own authentication information |
| 0x07 | IP Address | SSID, Serial, BSSID |

Furthermore, steps S2701 and S2702 may be omitted, if necessary. That is, if information for Wi-Fi handover has been fully checked through an advertising packet received from the second device in an advertising state, the first device may directly request handover without sending a request message.

Thereafter, the first device may send a write request message, including control information, to the second device in order to indicate the ON of Wi-Fi, that is, an alternative communication technology to be connected, and the activation of a service (S2703).

At this time, the first device may request the writing of a "Handover Control Point" characteristic through the write request message in order to instruct the ON of the Wi-Fi and the activation of the service.

The control information may include an operation code (Opcode) for indicating a specific operation for the second device and a parameter value therefor. In this case, the Opcode may be Opcode for activating Wi-Fi Transport.

Furthermore, the parameter may be configured as illustrated in FIG. 28. That is, mode (soft or over) of Wi-Fi, service information, and information about the ID of a target AP may be requested through the Type field, and a detailed value may be indicated through the Value field.

At this time, the first device may request the activation of some or all of services which may be supported by the second device through the write request message.

The first device may receive a write response message in response to the write request message.

The write response message may include result code for the write request message, such as that shown in FIG. 16.

In this case, the second device may send the write response message prior to step S2704.

The second device activates the ON of Wi-Fi, that is, alternative communication means, and the service in response to the instruction of the first device. In this case, the second device may activate only some or all of the services instructed by the first device.

Thereafter, the second device may send an indication message to the first device (S2704).

The second device may send the indication message to the first device as ACK if the instruction of the first device has been normally performed.

Furthermore, the indication message may include parameters illustrated in FIG. 29. As illustrated in FIG. 29, the parameters may be configured in an LTV format. The ID of a target AP may be indicated through a Type field, and the ID value of a detailed target AP may be indicated through a Value field.

The indication message may include activation information indicating an activated service of a plurality of services because only some of the plurality of requested services can be activated if the first device has requested the activation of the plurality of services.

Thereafter, the first device and the second device form a Wi-Fi connection (S2705).

Power consumption and the time taken for a connection can be reduced because Wi-Fi is connected through Bluetooth LE, that is, low power communication means, as described above.

In accordance with the existing Wi-Fi handover method, a first device and a second device perform a Wi-Fi connection procedure according to a method determined in the Wi-Fi protocol, after exchanging information about the ID of a target AP. That is, the first device and the second device have to perform authentication again in a Wi-Fi connection step although an authentication procedure has already been performed in a BLE connection step.

Accordingly, the existing Wi-Fi handover method has problems in that user convenience is reduced and the time that it takes to perform a Wi-Fi connection is increased because an authentication procedure is performed unnecessarily and repeatedly.

Accordingly, in order to solve such problems, an embodiment of the present invention proposes a method capable of increasing convenience and promoting a rapid connection by omitting or simplifying a Wi-Fi authentication procedure in a Wi-Fi connection step after Wi-Fi authentication information is exchanged through Bluetooth LE.

FIG. 30 is an embodiment to which the present invention may be applied and is a diagram showing a method for forming a Wi-Fi connection between devices through Bluetooth LE.

It is assumed that FIG. 30(a) corresponds to a case where a second device (or provider) operates as a soft AP and that FIG. 30(b) corresponds to a case where a first device (or seeker) operates as a soft AP.

After exchanging authentication information, the first device and the second device may perform an authentication procedure in a BLE connection state. Thereafter, the first device and the second device may omit an authentication procedure in a Wi-Fi connection step.

In this case, for example, the first device and the second device may perform the authentication procedure using the Pass key entry method in the BLE connection state. Furthermore, for example, the first device and the second device may omit an authentication procedure in the OOB method in the Wi-Fi connection step.

It is assumed that FIG. 30(c) corresponds to a case where a first device has been first connected to a third device (or AP) through a Wi-Fi connection and FIG. 30(d) corresponds to a case where a second device has been first connected to a third device (or AP) through a Wi-Fi connection.

Referring to FIG. 30(C), after performing an authentication procedure in a Wi-Fi connection step, the first device and the third device may exchange authentication information. Thereafter, in a BLE connection state between the first device and a second device, the first device may send Wi-Fi authentication information to the second device. Thereafter, the second device may omit an authentication procedure in a step of forming a Wi-Fi connection with the third device.

In this case, for example, the first device and the third device may perform the authentication procedure using the Pass phrase method, and the second device and the third device may omit the authentication procedure using the OOB method.

Referring to FIG. 30(d), after performing an authentication procedure in a Wi-Fi connection step, the second device and the third device may exchange authentication information. Thereafter, in a BLE connection state between a first device and the second device, the second device may send Wi-Fi authentication information to the first device. Thereafter, the first device may omit an authentication procedure in a step of forming a Wi-Fi connection with the third device.

In this case, for example, the second device and the third device may perform the authentication procedure through the Pass phrase method. The first device and the third device may omit the authentication procedure through the OOB method.

FIG. 31 is an embodiment to which the present invention may be applied and is a diagram showing a method for forming a Wi-Fi connection between devices through Bluetooth LE.

Referring to FIG. 31, after Bluetooth LE is connected through the Bluetooth LE procedure described with reference to FIG. 8, a first device may connect Wi-Fi by instructing a second device (or provider) to connect alternative communication means through the Bluetooth LE.

In this case, as in the case of FIG. 30(a), it is assumed that the second device (or provider) operates as a soft AP.

More specifically, the first device and the second device may form the Bluetooth LE connection through the Bluetooth LE procedure described with reference to FIG. 8.

In order to form the Bluetooth LE connection, the second device may send an advertising message to the first device.

Furthermore, the advertising message may include TDS advertising data.

The TDS advertising data may include serial information, a Wi-Fi state, factory mode information, current Wi-Fi mode, OSC, and a Wi-Fi connection count, for example.

Furthermore, for example, the advertising message may include at least one of state information indicating the ON or OFF of Wi-FI, service list information indicating at least one service which may be provided through Wi-Fi, and ID information for identifying the second device.

The first device sends a read request message for requesting information related to Wi-Fi handover to the second device (S3101).

The first device may request data related to Wi-Fi handover, including Wi-Fi authentication information, through the read request message.

That is, the read request message may include information related to Wi-Fi handover and authentication information related to Wi-Fi authentication.

In this case, the authentication information may include a network key, a basic service set identifier (BSSID), a service set identifier (SSID), a pass phrase or an algorithm used for authentication, for example. Furthermore, for example, the authentication information may be configured as in Table 3 below.

In this case, the first device may request the writing of a "Handover Control Point" characteristic through the write request message in order to instruct the ON of the Wi-Fi and the activation of the service.

Furthermore, the write request message may include a request for authentication information for omitting an authentication procedure in a Wi-Fi connection. The authentication information may be configured as in the example of Table 3.

If a request for the authentication information for the Wi-Fi connection is included in the write request message, step S3101 may be included in step S3103 or may be omitted.

Furthermore, the first device may request the activation of some or all of services which may be supported by the second device through the write request message.

The second device may send a response message in response to the write request message (S3104).

Step S3104 is an optional step and may be omitted, if necessary.

The second device may send an indication message to the first device (S3105).

The second device may send the indication message to the first device as ACK if the instruction of the first device has been normally performed.

Furthermore, the indication message may include result code indicating a value according to the write request. That is, the second device may notify the first device whether Wi-Fi has become ON or OFF based on the control information indicating the ON of Wi-Fi through the indication message.

TABLE 3

| OFFSET | CONTENT | LENGTH | EXPLANATION |
| --- | --- | --- | --- |
| 0 | 0x104A | 2 | WPS Attribute Type: Version |
| 1 | 0x0001 | 2 | Version Length: 1 byte |
| 2 | 0x10 | 1 | Version = 1.0 |
| 3 | 0x100E | 2 | WPS Attribute: Credential |
| 4 | 0x0039 | 2 | Credential Length: 57 bytes |
| 5 | 0x1026 | 2 | WPS Attribute: Network Index |
| 6 | 0x0001 | 2 | Network Index Length: 1 byte |
| 7 | 0x01 | 1 | Network Index = 1 |
| 8 | 0x1045 | 2 | WPS Attribute: SSID |
| 9 | 0x0008 | 2 | SSID Length: 8 bytes |
| 10 | "HomeWLAN" | 8 | SSID = "HomeWLAN" |
| 11 | 0x1003 | 2 | WPS Attribute: Authentication Type |
| 12 | 0x0002 | 2 | Authentication Type Length: 2 bytes |
| 13 | 0x0020 | 2 | Authentication Type: WPA2PSK |
| 14 | 0x100F | 2 | WPS Attribute: Encryption Type |
| 15 | 0x0002 | 2 | Encryption Type Length: 2 bytes |
| 16 | 0x0008 | 2 | Encryption Type: AES |
| 17 | 0x1027 | 2 | WPS Attribute: Network Key |
| 18 | 0x000E | 2 | Network Key Length: 14 bytes |
| 19 | "MyPreSharedKey" | 14 | Network Key = "MyPreSharedKey" |
| 20 | 0x1020 | 2 | WPS Attribute: MAC Address |
| 21 | 0x0006 | 2 | MAC Address Length: 6 bytes |
| 22 | 00:07:E9:4C:A8:1C | 6 | MAC Address |

The second device sends a read response message to the first device in response to the read request message (S3102).

The read response message may include the data related to handover or the authentication information.

The first device sends a write request message, including control information, to the second device in order to indicate the ON of Wi-Fi, that is, an alternative communication technology to be connected, and the activation of a service (S3103).

Furthermore, if the write request message includes authentication information for a Wi-Fi connection, the indication message may include authentication information for omitting an authentication procedure when the Wi-Fi connection is performed. In this case, the authentication information may include the pieces of information illustrated in Table 3.

If the indication message includes authentication information for a Wi-Fi connection, step S3102 may be included in step S3105 or may be omitted.

The first device may send a confirmation message for the indication message to the second device (S3106).

Step S3106 is an optional procedure and may be omitted, if necessary.

Furthermore, the first device and the second device may form a Wi-Fi connection. Furthermore, the first device and the second device may omit an authentication procedure in a Wi-Fi connection procedure based on the Wi-Fi authentication information received at step S3102 or S3105.

In accordance with the present embodiment, prior to a handover request procedure, a procedure for exchanging Wi-Fi authentication information may be performed. A Wi-Fi handover request procedure and a procedure for exchanging Wi-Fi authentication information may be performed at the same time.

In FIG. 31, an example in which the second device (i.e., provider) operates as a soft AP has been described, for convenience of description, but the present invention is not limited thereto.

That is, the first device (i.e., seeker) may operate as a soft AP. In this case, at step S3103, the first device may request the writing of the authentication information necessary to perform Wi-Fi authentication through the write request message.

In other words, if the first device operates as a soft AP, it may send Wi-Fi authentication information to the second device through the write request message.

FIG. 32 is an embodiment to which the present invention may be applied and is a diagram showing a method for forming a Wi-Fi connection between devices through Bluetooth LE.

Referring to FIG. 32, it is assumed that a first device (or seeker) has first formed a Wi-Fi connection with a third device (or AP) and has obtained information related to Wi-Fi through the Wi-Fi connection.

A second device sends an advertising message to the first device (S3201).

The second device may notify surrounding devices of its presence by sending the advertising message to the surrounding devices using the three advertising channels using the method described with reference to FIG. 8.

In this case, the advertising message may include information (i.e., TDS AD data) related to Wi-Fi Transport. The TDS advertising data may include serial information, a Wi-Fi state, factory mode information, current Wi-Fi mode, OSC, and a Wi-Fi connection count, for example.

Furthermore, for example, the advertising message may include at least one of state information indicating the ON or OFF of Wi-FI, service list information indicating at least one service which may be provided through Wi-Fi, and ID information for identifying the second device.

Thereafter, the first device and the second device perform a Bluetooth LE connection procedure. The first device and the second device may form a BLE connection using the method described with reference to FIG. 8.

Furthermore, the first device and the second device may perform an authentication procedure, if necessary, in the step of forming the BLE connection.

The first device sends a write request message, including control information, to the second device in order to indicate the ON of Wi-Fi, that is, an alternative communication technology to be connected, and the activation of a service (S3202).

In this case, the first device may request the writing of a "Handover Control Point" characteristic in order to instruct the ON of the Wi-Fi and the activation of the service through the write request message.

Furthermore, the write request message may include authentication information for omitting an authentication procedure when a Wi-Fi connection is performed. The authentication information may be configured as in the example of Table 3.

For example, the authentication information may include at least one of a network key, a basic service set identifier (BSSID), a service set identifier (SSID), a pass phrase and an algorithm used for authentication.

Furthermore, the first device may request the activation of some or all of services which may be supported by the second device through the write request message.

The second device may send a response message to the first device in response to the write request message (S3203).

Step S3203 is an optional step and may be omitted, if necessary.

The second device may send an indication message to the first device (S3204).

The second device may send the indication message to the first device as ACK if the instruction of the first device has been normally performed.

Furthermore, the indication message may include result code indicating a value according to the write request. In other words, the indication message may include result information indicating the state of the success of a Wi-Fi connection or a failure of the Wi-Fi connection attributable to a specific reason.

For example, the second device may notify the first device whether the Wi-Fi has become ON or OFF based on control information indicating the ON of the Wi-Fi through the indication message.

The first device may send a confirmation message for the indication message to the second device (S3205).

Step S3205 is an optional procedure and may be omitted, if necessary.

The Wi-Fi Transport of the second device may be activated based on the control information included in the write request message, and the second device may form a Wi-Fi connection with the third device based on Wi-Fi authentication information received from the first device without an authentication procedure.

The second device and the third device may omit an authentication procedure in the Wi-Fi connection step based on the authentication information received from the first device, and may perform an authentication procedure based on the authentication information without an additional manipulation (or input) from a user.

The first device and the second device that have form the Wi-Fi connection with the third device transmit and receive data using Wi-Fi communication.

FIG. 33 is an embodiment to which the present invention may be applied and is a diagram showing a method for forming a Wi-Fi connection between devices through Bluetooth LE.

Referring to FIG. 33, it is assumed that a second device (or provider) has first formed a Wi-Fi connection with a third device (or AP) and has obtained information related to Wi-Fi through the Wi-Fi connection.

The second device sends an advertising message to a first device (S3301).

The second device may notify surrounding devices of its presence by sending the advertising message to the surrounding devices using the three advertising channels through the method described with reference to FIG. 8.

In this case, the advertising message may include information (i.e., TDS AD data) related to Wi-Fi Transport. The TDS advertising data may include serial information, a Wi-Fi state, factory mode information, current Wi-Fi mode, OSC, and a Wi-Fi connection count, for example.

Furthermore, for example, the advertising message may include at least one of state information indicating the ON or OFF of Wi-FI, service list information indicating at least one service which may be provided through Wi-Fi, and ID information for identifying the second device.

Thereafter, the first device and the second device perform a Bluetooth LE connection procedure. The first device and the second device may form a BLE connection using the method described with reference to FIG. 8.

Furthermore, the first device and the second device may perform an authentication procedure, if necessary, in the step of forming the BLE connection.

The first device sends a write request message, including control information, to the second device in order to indicate the ON of Wi-Fi, that is, an alternative communication technology to be connected, and the activation of a service (S3302).

In this case, the first device may request the writing of a "Handover Control Point" characteristic through the write request message in order to instruct the ON of the Wi-Fi and the activation of the service.

Furthermore, the write request message may include a request for authentication information for omitting an authentication procedure when a Wi-Fi connection is performed. The authentication information may be configured as in the example of Table 3.

For example, the authentication information may include at least one of a network key, a basic service set identifier (BSSID), a service set identifier (SSID), a pass phrase, and an algorithm used for authentication.

Furthermore, the first device may request the activation of some or all of services which may be supported by the second device through the write request message.

The second device may send a response message in response to the write request message (S3303).

Step S3303 is an optional step and may be omitted, if necessary.

The second device sends an indication message to the first device (S3304).

The second device may send the indication message to the first device as ACK if the instruction of the first device has been normally performed.

Furthermore, the indication message may include result code indicating a value according to the write request. In other words, the indication message may include result information indicating the state of the success of a Wi-Fi connection or a failure of the Wi-Fi connection attributable to a specific reason.

For example, the second device may notify the first device whether the Wi-Fi has become ON or OFF based on control information indicating the ON of the Wi-Fi through the indication message.

Furthermore, the indication message may include requested authentication information from the first device. In this case, the authentication information may include the pieces of information illustrated in Table 3.

The first device may send a confirmation message for the indication message to the second device (S3305).

Step S3305 is an optional procedure and may be omitted, if necessary.

The first device may form a Wi-Fi connection with the third device based on the Wi-Fi authentication information included in the indication message without an authentication procedure.

The first device and the third device may omit the authentication procedure in the Wi-Fi connection step based on the authentication information received from the second device, and may perform an authentication procedure based on the authentication information without an additional manipulation from a user.

The first device and the second device that have formed the Wi-Fi connection with the third device may transmit and receive data through Wi-Fi communication.

In accordance with the method proposed by an embodiment of the present invention, a Wi-Fi connection between two devices may be mediated using Bluetooth LE.

In contrast, a Wi-Fi connection between two devices may be mediated using NFC wireless communication. However, since the NFC wireless communication technology has a very short communication distance, a Wi-Fi connection method between two devices using NFC has a disadvantage in that a device that arbitrates the connection of the two devices (hereinafter referred to as a "handover mediator") must be very close to each of the two devices more than once. In other words, if the NFC wireless communication technology is used, there is a disadvantage in that a very limited distance of 1~2 cm, that is, a distance for the connection arbitration of two devices, is required.

Accordingly, a Wi-Fi connection method using NFC wireless communication causes inconvenience for a user because the user must bring a handover mediator into two devices, and corresponds to a method not suitable for a UX viewpoint.

If a Wi-Fi connection between two devices is mediated using Bluetooth LE, however, it is not necessary to perform communication because two devices are very close as in the NFC wireless communication method. That is, in accordance with a method proposed by an embodiment of the present invention, user convenience can be significantly improved compared to a Wi-Fi connection method using NFC wireless communication.

If a connection between two devices is mediated through Bluetooth LE communication, a mediatable distance may be set by taking into consideration authentication or security. In other words, a mediatable maximum distance may be set and mediation may be performed within the range of the mediatable maximum distance.

In this case, the mediatable maximum distance may also be called a threshold distance, a threshold, a mediation distance, a handover distance or a handover mediation distance.

Furthermore, the distance between devices may be determined using an RSSI, for example.

For example, if a distance that may be mediated, that is, a handover mediator distance, is set to 5 m, a Wi-Fi connection between devices may be permitted only when a handover mediator is within the range of 5 m.

A problem that may occur in terms of security due to a hacker, such as a connection between devices, can be prevented by setting a connection between two devices so that the connection is permitted within a specific range as described above.

For example, in FIGS. 32 and 33, a mediatable maximum distance may be set by including distance information indicating the mediatable maximum distance in which data may be transmitted and received through Bluetooth LE in the advertising message transmitted at step S3201 or S3301.

Furthermore, the second device (i.e., provider) may be connected to the third device (i.e., AP) by only a handover mediator within a mediatable maximum distance by receiving authentication information or a write request message for Wi-Fi handover from a device within the mediatable maximum distance from the second device.

FIG. 34 is a diagram for illustrating effects according to the formation of a Wi-Fi connection between devices through Bluetooth LE in accordance with an embodiment of the present invention.

Referring to FIG. 34, FIG. 34(a) shows a procedure for forming a Wi-Fi connection in a BLE connection state using the existing method, and FIG. 34(b) shows a procedure for performing Wi-Fi handover through Bluetooth LE. Furthermore, the BLE connection procedure and the Wi-Fi connection procedure are distinguished based on a "Wi-Fi wake-up" step.

First, in accordance with an embodiment of the present invention, duration of a "Wi-Fi wake-up" procedure for activating Wi-Fi Transport in order to perform a Wi-Fi connection in the BLE connection state can be significantly reduced.

In the case of FIG. 34(a), a first device and a second device switch from a Wi-Fi OFF state to a Wi-Fi ON state, and are configured to perform a Listen/Scan operation before searching for a device supporting Wi-Fi Transport.

In contrast, in the case of FIG. 34(b), as described above, duration of the "Wi-Fi wake-up" procedure is reduced because the writing of a "Handover Control Point" characteristic can be requested in order to instruct the activation of Wi-Fi in the BLE connection state.

First, in accordance with an embodiment of the present invention, a procedure for forming a Wi-Fi connection can be simplified because Wi-Fi handover is performed after a BLE connection. Accordingly, duration of the procedure can be significantly reduced.

Furthermore, in the case of FIG. 34(a), the first device and the second device need to perform a "Device Discovery" procedure, a "Service Discovery" procedure, a "GO Negotiation" procedure, a "Security Establishment" procedure, and an "IP Address acquisition" procedure for the Wi-Fi connection.

In this case, the "Device Discovery" procedure is a procedure for obtaining information, such as a device name, through a probe request/response exchange.

The "Service Discovery" procedure is a procedure for searching for a service which may be provided by a device through Wi-Fi.

The "GO Negotiation" procedure is a procedure for determining a group owner (i.e., a device operating as an AP).

The "Security Establishment" procedure is a procedure for exchanging a message or encryption key for security.

The "IP Address acquisition" procedure is a procedure for obtaining a network ID and the ID of a target AP.

In contrast, in the case of FIG. 34(b), since data for Wi-Fi handover can be exchanged and Wi-Fi authentication information can be exchanged in a BLE connection state, the "Device Discovery" procedure, the "Service Discovery" procedure, the "GO Negotiation" procedure, the "Security Establishment" procedure, and the "IP Address acquisition" procedure may be omitted. Accordingly, duration for a Wi-Fi connection can be significantly reduced compared to the case of FIG. 34(a).

The present invention is not limited and applied to the configurations and methods of the aforementioned embodiments, but some or all of the embodiments may be selectively combined and configured so that the embodiments are modified in various ways.

Furthermore, the present invention described above may be substituted, modified or changed by a person having ordinary skill in the art to which the present invention pertains without departing from the technological spirit of the present invention, and thus is not restricted by the aforementioned embodiments and the accompanying drawings.

This specification relates to Bluetooth data transmission and reception, and more particularly, to a method and apparatus for connecting alternative communication means using a Bluetooth low energy (BLE) technology.

In accordance with an embodiment of the present invention, a surrounding device supporting Bluetooth BR/EDR or Wi-Fi and/or services which may be provided can be searched for through Bluetooth LE.

Furthermore, in accordance with an embodiment of the present invention, user convenience can be improved by providing a user with information about devices discovered through Bluetooth LE.

Furthermore, in accordance with an embodiment of the present invention, consumption power necessary for device discovery can be reduced because information for the connection of Bluetooth BR/EDR or Wi-Fi and an available service is exchanged with a discovered device through Bluetooth LE to form the connection.

Furthermore, in accordance with an embodiment of the present invention, user convenience can be improved and a Wi-Fi connection between devices can be rapidly formed by omitting or simplifying a Wi-Fi authentication procedure in a Wi-Fi connection step after Wi-Fi authentication information is exchanged through Bluetooth LE.

Furthermore, in accordance with an embodiment of the present invention, a Wi-Fi connection between devices can be conveniently formed by mediating a Wi-Fi connection between devices through Bluetooth LE so that the Wi-Fi connection is formed.

Furthermore, in accordance with an embodiment of the present invention, user convenience can be improved because a Wi-Fi connection between devices can be performed by limitedly using an interface for Wi-Fi authentication/connection.

Advantages of the following embodiments are not limited to the aforementioned advantages, and various other advantages not described in this specification may be evidently understood by those skilled in the art to which the embodiments pertain from the following description.

What is claimed is:

1. A method for forming a Wi-Fi connection between a second device and a third device using Bluetooth low energy (LE) in a wireless communication system, the method performed by a first device and comprising:
   receiving an advertising message from the second device;
   forming a Bluetooth LE connection with the second device based on the advertising message;
   transmitting a first write request message to the second device requesting writing of authentication information necessary for performing Wi-Fi authentication with the third device,
   wherein the first write request message includes the authentication information;
   receiving a write response message from the second device in response to the first write request message; and
   transmitting a second write request message to the second device requesting writing of Opcode indicating a Wi-Fi connection with the third device,
   wherein the second write request message includes identification information for identifying the third device, and wherein the Wi-Fi connection is formed between the second device and the third device based on the authentication information.

2. The method of claim 1, wherein the authentication information includes at least one of a network key, a basic service set identifier (BSSID), a service set identifier (SSID), a pass phrase, or an algorithm used for authentication.

3. The method of claim 1, wherein:
the advertising message further includes distance information indicating a threshold distance in which data is capable of transmitted and received through the Bluetooth LE, and
the second write request message is transmitted when the first device is within the threshold distance.

4. The method of claim 1, wherein the advertising message includes a state information indicating an ON or OFF of the Wi-FI, a service list information indicating at least one service capable of being provided through the Wi-Fi, or a identification information for identifying the second device.

5. The method of claim 1, wherein if the state information indicates OFF, the second write request message includes control information indicating an activation of the Wi-Fi.

6. The method of claim 1, further comprising receiving an indication message including result information indicating a state of a success of the Wi-Fi connection or a failure of the Wi-Fi connection attributable to a specific reason from the second device in response to the second write request message.

7. A first device for forming a Wi-Fi connection between a second device and a third device using Bluetooth low energy (LE) in a wireless communication system, the first device comprising:
a communication unit; and
a processor functionally connected to the communication unit,
wherein the processor is configured to:
control the communication unit to receive an advertising message from the second device,
form a Bluetooth LE connection with the second device based on the advertising message,
control the communication unit to transmit a first write request message to the second device requesting writing of authentication information necessary for performing Wi-Fi authentication with the third device,
wherein the first write request message includes the authentication information,
control the communication unit to receive a write response message from the second device in response to the first write request message, and
control the communication unit to transmit a second write request message to the second device requesting writing of Opcode indicating a Wi-Fi connection with the third device,
wherein the second write request message includes identification information for identifying the third device, and
wherein the Wi-Fi connection is formed between the second device and the third device based on the authentication information.

8. A method for forming a Wi-Fi connection using Bluetooth low energy (LE) in a wireless communication system, the method performed by a first device and comprising:
receiving an advertising message from a second device;
forming a Bluetooth LE connection with the second device based on the advertising message;
transmitting a read request message to the second device requesting reading of authentication information related to Wi-Fi authentication;
receiving a read response message including the authentication information from the second device in response to the read request message;
transmitting a write request message to request a writing of Opcode indicating a Wi-Fi connection to the second device; and
forming the Wi-Fi connection with the second device based on the authentication information,
wherein the advertising message includes a state information indicating an ON or OFF of the Wi-Fi, a service list information indicating at least one service capable of being provided through the Wi-Fi, or a identification information for identifying the second device, and
wherein if the state information indicates OFF, the write request message includes control information indicating an activation of the Wi-Fi.

9. The method of claim 8, wherein the authentication information includes at least one of a network key, a basic service set identifier (BSSID), a service set identifier (SSID), a pass phrase, or an algorithm used for authentication.

10. The method of claim 8, wherein:
the advertising message further includes distance information indicating a threshold distance in which data is capable of transmitted and received through the Bluetooth LE, and
the write request message is transmitted when the first device is within the threshold distance.

11. The method of claim 8, further comprising receiving an indication message including result information indicating a state of a success of the Wi-Fi connection or a failure of the Wi-Fi connection attributable to a specific reason from the second device in response to the write request message.

* * * * *